United States Patent
Chiou

(10) Patent No.: US 7,965,046 B2
(45) Date of Patent: Jun. 21, 2011

(54) FULL-BRIDGE AND HALF-BRIDGE COMPATIBLE DRIVER TIMING SCHEDULE FOR DIRECT DRIVE BACKLIGHT SYSTEM

(75) Inventor: Chii-Fa Chiou, Lake Forest, CA (US)

(73) Assignee: Microsemi Corporation, Irvine, CA (US)

( * ) Notice: Subject to any disclaimer, the term of this patent is extended or adjusted under 35 U.S.C. 154(b) by 3 days.

(21) Appl. No.: 12/638,889

(22) Filed: Dec. 15, 2009

(65) Prior Publication Data

US 2010/0090611 A1 Apr. 15, 2010

Related U.S. Application Data

(60) Division of application No. 11/526,324, filed on Sep. 25, 2006, now Pat. No. 7,646,152, which is a continuation of application No. 11/090,246, filed on Mar. 25, 2005, now Pat. No. 7,112,929.

(60) Provisional application No. 60/558,512, filed on Apr. 1, 2004.

(51) Int. Cl.
*H05B 37/00* (2006.01)
(52) U.S. Cl. .......................... 315/194; 315/198; 315/224
(58) Field of Classification Search .................. 315/194, 315/199, 196, 197, 198, 224, 226, 219, 220, 315/276; 345/102
See application file for complete search history.

(56) References Cited

U.S. PATENT DOCUMENTS

| | | | |
|---|---|---|---|
| 2,429,162 A | 10/1947 | Russell et al. | |
| 2,440,984 A | 5/1948 | Summers | |
| 2,572,258 A | 10/1951 | Goldfield et al. | |
| 2,965,799 A | 12/1960 | Brooks et al. | |
| 2,968,028 A | 1/1961 | Eilichi et al. | |
| 3,141,112 A | 7/1964 | Eppert | |
| 3,449,629 A | 6/1969 | Wigert et al. | |
| 3,565,806 A | 2/1971 | Ross | |
| 3,597,656 A | 8/1971 | Douglas | |
| 3,611,021 A | 10/1971 | Wallace | |
| 3,683,923 A | 8/1972 | Anderson | |
| 3,737,755 A | 6/1973 | Calkin et al. | |
| 3,742,330 A | 6/1973 | Hodges et al. | |
| 3,916,283 A | 10/1975 | Burrows | |
| 3,936,696 A | 2/1976 | Gray | |
| 3,944,888 A | 3/1976 | Clark | |
| 4,053,813 A | 10/1977 | Komrumpf et al. | |
| 4,060,751 A | 11/1977 | Anderson | |

(Continued)

FOREIGN PATENT DOCUMENTS

EP 0326114 8/1989

(Continued)

OTHER PUBLICATIONS

Bradley, D.A., "Power Electronics" 2nd Edition; Chapman & Hall, 1995; Chapter 1, pp. 1-38.

(Continued)

*Primary Examiner* — David Hung Vu
(74) *Attorney, Agent, or Firm* — Knobbe, Martens, Olson & Bear, LLP

(57) ABSTRACT

A driver circuit or controller flexibly drives either a half-bridge or a full-bridge switching network in a backlight inverter without modification, redundant circuitry or additional components. The driver circuit includes four outputs to provide four respective driving signals that establish a periodic timing sequence using a zero-voltage switching technique for semiconductor switches in the switching network.

20 Claims, 12 Drawing Sheets

U.S. PATENT DOCUMENTS

| | | |
|---|---|---|
| 4,204,141 A | 5/1980 | Nuver |
| 4,277,728 A | 7/1981 | Stevens |
| 4,307,441 A | 12/1981 | Bello |
| 4,353,009 A | 10/1982 | Knoll |
| 4,388,562 A | 6/1983 | Josephson |
| 4,392,087 A | 7/1983 | Zansky |
| 4,437,042 A | 3/1984 | Morais et al. |
| 4,441,054 A | 4/1984 | Bay |
| 4,463,287 A | 7/1984 | Pitel |
| 4,469,988 A | 9/1984 | Cronin |
| 4,480,201 A | 10/1984 | Jaeschke |
| 4,523,130 A | 6/1985 | Pitel |
| 4,543,522 A | 9/1985 | Moreau |
| 4,544,863 A | 10/1985 | Hashimoto |
| 4,555,673 A | 11/1985 | Huijsing et al. |
| 4,562,338 A | 12/1985 | Okami |
| 4,567,379 A | 1/1986 | Corey et al. |
| 4,572,992 A | 2/1986 | Masaki |
| 4,574,222 A | 3/1986 | Anderson |
| 4,585,974 A | 4/1986 | Stupp et al. |
| 4,622,496 A | 11/1986 | Dattilo et al. |
| 4,626,770 A | 12/1986 | Price, Jr. |
| 4,630,005 A | 12/1986 | Clegg et al. |
| 4,663,566 A | 5/1987 | Nagano |
| 4,663,570 A | 5/1987 | Luchaco et al. |
| 4,672,300 A | 6/1987 | Harper |
| 4,675,574 A | 6/1987 | Delflache |
| 4,682,080 A | 7/1987 | Ogawa et al. |
| 4,686,615 A | 8/1987 | Ferguson |
| 4,689,802 A | 8/1987 | McCambridge |
| 4,698,554 A | 10/1987 | Stupp et al. |
| 4,700,113 A | 10/1987 | Stupp et al. |
| 4,717,863 A | 1/1988 | Zeiler |
| 4,745,339 A | 5/1988 | Izawa et al. |
| 4,761,722 A | 8/1988 | Pruitt |
| 4,766,353 A | 8/1988 | Burgess |
| 4,779,037 A | 10/1988 | LoCascio |
| 4,780,696 A | 10/1988 | Jirka |
| 4,792,747 A | 12/1988 | Schroeder |
| 4,812,781 A | 3/1989 | Regnier |
| 4,847,745 A | 7/1989 | Shekhawat |
| 4,862,059 A | 8/1989 | Tominaga et al. |
| 4,885,486 A | 12/1989 | Shekhawat et al. |
| 4,893,069 A | 1/1990 | Harada et al. |
| 4,902,942 A | 2/1990 | El-Hamamsy et al. |
| 4,939,381 A | 7/1990 | Shibata |
| 4,998,046 A | 3/1991 | Lester |
| 5,023,519 A | 6/1991 | Jensen |
| 5,030,887 A | 7/1991 | Guisinger |
| 5,036,255 A | 7/1991 | McKnight et al. |
| 5,049,790 A | 9/1991 | Herfurth et al. |
| 5,057,808 A | 10/1991 | Dhyanchand |
| 5,083,065 A | 1/1992 | Sakata et al. |
| 5,089,748 A | 2/1992 | Ihms |
| 5,105,127 A | 4/1992 | Lavaud et al. |
| 5,130,565 A | 7/1992 | Girmay |
| 5,130,635 A | 7/1992 | Kase |
| 5,173,643 A | 12/1992 | Sullivan et al. |
| 5,220,272 A | 6/1993 | Nelson |
| 5,235,254 A | 8/1993 | Ho |
| 5,289,051 A | 2/1994 | Zitta |
| 5,317,401 A | 5/1994 | Dupont et al. |
| 5,327,028 A | 7/1994 | Yum et al. |
| 5,349,272 A | 9/1994 | Rector |
| 5,406,305 A | 4/1995 | Shimomura et al. |
| 5,410,221 A | 4/1995 | Mattas et al. |
| 5,420,779 A | 5/1995 | Payne |
| 5,430,641 A | 7/1995 | Kates |
| 5,434,477 A | 7/1995 | Crouse et al. |
| 5,440,208 A | 8/1995 | Uskali et al. |
| 5,463,287 A | 10/1995 | Kurihara et al. |
| 5,471,130 A | 11/1995 | Agiman |
| 5,475,284 A | 12/1995 | Lester et al. |
| 5,475,285 A | 12/1995 | Konopka |
| 5,479,337 A | 12/1995 | Voigt |
| 5,485,057 A | 1/1996 | Smallwood et al. |
| 5,485,059 A | 1/1996 | Yamashita et al. |
| 5,485,487 A | 1/1996 | Orbach et al. |
| 5,493,183 A | 2/1996 | Kimball |
| 5,495,405 A | 2/1996 | Fujimura et al. |
| 5,510,974 A | 4/1996 | Gu et al. |
| 5,514,947 A | 5/1996 | Berg |
| 5,519,289 A | 5/1996 | Katyl et al. |
| 5,528,192 A | 6/1996 | Agiman |
| 5,539,281 A | 7/1996 | Shackle et al. |
| 5,548,189 A | 8/1996 | Williams |
| 5,552,697 A | 9/1996 | Chan |
| 5,557,249 A | 9/1996 | Reynal |
| 5,563,473 A | 10/1996 | Mattas et al. |
| 5,563,501 A | 10/1996 | Chan |
| 5,574,335 A | 11/1996 | Sun |
| 5,574,356 A | 11/1996 | Parker |
| 5,608,312 A | 3/1997 | Wallace |
| 5,612,594 A | 3/1997 | Maheshwari |
| 5,612,595 A | 3/1997 | Maheshwari |
| 5,615,093 A | 3/1997 | Nalbant |
| 5,619,104 A | 4/1997 | Eunghwa |
| 5,619,402 A | 4/1997 | Liu |
| 5,621,281 A | 4/1997 | Kawabata et al. |
| 5,629,588 A | 5/1997 | Oda et al. |
| 5,635,799 A | 6/1997 | Hesterman |
| 5,652,479 A | 7/1997 | LoCascio et al. |
| 5,663,613 A | 9/1997 | Yamashita et al. |
| 5,705,877 A | 1/1998 | Shimada |
| 5,710,489 A | 1/1998 | Nilssen |
| 5,712,533 A | 1/1998 | Corti |
| 5,712,776 A | 1/1998 | Palara et al. |
| 5,719,474 A | 2/1998 | Vitello |
| 5,744,915 A | 4/1998 | Nilssen |
| 5,748,460 A | 5/1998 | Ishikawa |
| 5,751,115 A | 5/1998 | Jayaraman et al. |
| 5,751,120 A | 5/1998 | Zeitler et al. |
| 5,751,560 A | 5/1998 | Yokoyama |
| 5,754,012 A | 5/1998 | LoCascio |
| 5,754,013 A | 5/1998 | Praiswater |
| 5,760,760 A | 6/1998 | Helms |
| 5,770,925 A | 6/1998 | Konopka et al. |
| 5,777,439 A | 7/1998 | Hua |
| 5,786,801 A | 7/1998 | Ichise |
| 5,796,213 A | 8/1998 | Kawasaki |
| 5,808,422 A | 9/1998 | Venkitasubrahmanian et al. |
| 5,818,172 A | 10/1998 | Lee |
| 5,822,201 A | 10/1998 | Kijima |
| 5,825,133 A | 10/1998 | Conway |
| 5,828,156 A | 10/1998 | Roberts |
| 5,844,540 A | 12/1998 | Terasaki |
| 5,854,617 A | 12/1998 | Lee et al. |
| 5,859,489 A | 1/1999 | Shimada |
| 5,872,429 A | 2/1999 | Xia et al. |
| 5,880,946 A | 3/1999 | Biegel |
| 5,883,473 A | 3/1999 | Li et al. |
| 5,886,477 A | 3/1999 | Honbo et al. |
| 5,892,336 A | 4/1999 | Lin et al. |
| 5,901,176 A | 5/1999 | Lewison |
| 5,910,709 A | 6/1999 | Stevanovic et al. |
| 5,910,713 A | 6/1999 | Nishi et al. |
| 5,912,812 A | 6/1999 | Moriarty, Jr. et al. |
| 5,914,842 A | 6/1999 | Sievers |
| 5,923,129 A | 7/1999 | Henry |
| 5,923,546 A | 7/1999 | Shimada et al. |
| 5,925,988 A | 7/1999 | Grave et al. |
| 5,930,121 A | 7/1999 | Henry |
| 5,930,126 A | 7/1999 | Griffin et al. |
| 5,936,360 A | 8/1999 | Kaneko |
| 5,939,830 A | 8/1999 | Praiswater |
| 6,002,210 A | 12/1999 | Nilssen |
| 6,011,360 A | 1/2000 | Gradzki et al. |
| 6,016,245 A | 1/2000 | Ross |
| 6,020,688 A | 2/2000 | Moisin |
| 6,028,400 A | 2/2000 | Pol et al. |
| 6,037,720 A | 3/2000 | Wong et al. |
| 6,038,149 A | 3/2000 | Hiraoka et al. |
| 6,040,661 A | 3/2000 | Bogdan |
| 6,040,662 A | 3/2000 | Asayama |
| 6,043,609 A | 3/2000 | George et al. |
| 6,049,177 A | 4/2000 | Felper |
| 6,069,448 A | 5/2000 | Yeh |

| | | | | | | |
|---|---|---|---|---|---|---|
| 6,072,282 | A | 6/2000 | Adamson | 6,522,558 B2 | 2/2003 | Henry |
| 6,091,209 | A | 7/2000 | Hilgers | 6,531,831 B2 | 3/2003 | Chou et al. |
| 6,104,146 | A | 8/2000 | Chou et al. | 6,534,934 B1 | 3/2003 | Lin et al. |
| 6,108,215 | A | 8/2000 | Kates et al. | 6,559,606 B1 | 5/2003 | Chou et al. |
| 6,111,370 | A | 8/2000 | Parra | 6,563,479 B2 | 5/2003 | Weindorf et al. |
| 6,114,814 | A | 9/2000 | Shannon et al. | 6,570,344 B2 | 5/2003 | Lin |
| 6,121,733 | A | 9/2000 | Nilssen | 6,570,347 B2 | 5/2003 | Kastner |
| 6,127,785 | A | 10/2000 | Williams | 6,583,587 B2 | 6/2003 | Ito et al. |
| 6,127,786 | A | 10/2000 | Moison | 6,593,703 B2 | 7/2003 | Sun |
| 6,137,240 | A | 10/2000 | Bogdan | 6,628,093 B2 | 9/2003 | Stevens |
| 6,150,772 | A | 11/2000 | Crane | 6,630,797 B2 | 10/2003 | Qian et al. |
| 6,157,143 | A | 12/2000 | Bigio et al. | 6,633,138 B2 | 10/2003 | Shannon et al. |
| 6,160,362 | A | 12/2000 | Shone et al. | 6,642,674 B2 | 11/2003 | Liao et al. |
| 6,169,375 | B1 | 1/2001 | Moisin | 6,650,514 B2 | 11/2003 | Schmitt |
| 6,172,468 | B1 | 1/2001 | Hollander | 6,654,268 B2 | 11/2003 | Choi |
| 6,181,066 | B1 | 1/2001 | Adamson | 6,664,744 B2 | 12/2003 | Dietz |
| 6,181,076 | B1 * | 1/2001 | Trestman et al. ............ 315/224 | 6,680,834 B2 | 1/2004 | Williams |
| 6,181,082 | B1 | 1/2001 | Moisin | 6,703,998 B1 | 3/2004 | Kabel et al. |
| 6,181,083 | B1 | 1/2001 | Moisin | 6,707,264 B2 | 3/2004 | Lin et al. |
| 6,181,084 | B1 | 1/2001 | Lau | 6,710,555 B1 | 3/2004 | Terada et al. |
| 6,188,183 | B1 | 2/2001 | Greenwood et al. | 6,717,371 B2 | 4/2004 | Klier et al. |
| 6,194,841 | B1 | 2/2001 | Takahasi et al. | 6,717,372 B2 | 4/2004 | Lin et al. |
| 6,198,234 | B1 | 3/2001 | Henry | 6,717,375 B2 | 4/2004 | Noguchi et al. |
| 6,198,236 | B1 | 3/2001 | O'Neill | 6,724,602 B2 | 4/2004 | Giannopoulos |
| 6,198,238 | B1 | 3/2001 | Edelson | 6,765,354 B2 | 7/2004 | Klein |
| 6,211,625 | B1 | 4/2001 | Nilssen | 6,781,325 B2 | 8/2004 | Lee |
| 6,215,256 | B1 | 4/2001 | Ju | 6,784,627 B2 | 8/2004 | Suzuki et al. |
| 6,218,788 | B1 | 4/2001 | Chen et al. | 6,803,901 B1 | 10/2004 | Numao |
| 6,229,271 | B1 | 5/2001 | Liu | 6,804,129 B2 | 10/2004 | Lin |
| 6,239,558 | B1 | 5/2001 | Fujimura et al. | 6,809,718 B2 | 10/2004 | Wei et al. |
| 6,252,355 | B1 | 6/2001 | Meldrum et al. | 6,809,938 B2 | 10/2004 | Lin et al. |
| 6,255,784 | B1 | 7/2001 | Weindorf | 6,815,906 B1 | 11/2004 | Aarons et al. |
| 6,259,215 | B1 | 7/2001 | Roman | 6,816,142 B2 | 11/2004 | Oda et al. |
| 6,259,615 | B1 | 7/2001 | Lin | 6,856,099 B2 | 2/2005 | Chen et al. |
| 6,281,636 | B1 | 8/2001 | Okutsu et al. | 6,856,519 B2 | 2/2005 | Lin et al. |
| 6,281,638 | B1 | 8/2001 | Moisin | 6,864,867 B2 | 3/2005 | Biebl |
| 6,291,946 | B1 | 9/2001 | Hinman | 6,870,330 B2 | 3/2005 | Choi |
| 6,294,883 | B1 | 9/2001 | Weindorf | 6,876,157 B2 | 4/2005 | Henry |
| 6,307,765 | B1 | 10/2001 | Choi | 6,897,698 B1 | 5/2005 | Gheorghiu et al. |
| 6,310,444 | B1 | 10/2001 | Chang | 6,900,599 B2 | 5/2005 | Ribarich |
| 6,316,881 | B1 | 11/2001 | Shannon et al. | 6,900,600 B2 | 5/2005 | Rust et al. |
| 6,316,887 | B1 | 11/2001 | Ribarich et al. | 6,900,993 B2 | 5/2005 | Lin et al. |
| 6,317,347 | B1 | 11/2001 | Weng | 6,922,023 B2 | 7/2005 | Hsu et al. |
| 6,320,329 | B1 | 11/2001 | Wacyk | 6,930,893 B2 | 8/2005 | Vinciarelli |
| 6,323,602 | B1 | 11/2001 | De Groot et al. | 6,936,975 B2 | 8/2005 | Lin et al. |
| 6,331,755 | B1 | 12/2001 | Ribarich et al. | 6,947,024 B2 | 9/2005 | Lee et al. |
| 6,340,870 | B1 | 1/2002 | Yamashita et al. | 6,967,449 B2 | 11/2005 | Ishihara |
| 6,344,699 | B1 | 2/2002 | Rimmer | 6,967,657 B2 | 11/2005 | Lowles et al. |
| 6,351,080 | B1 | 2/2002 | Birk et al. | 6,969,958 B2 | 11/2005 | Henry |
| 6,356,035 | B1 | 3/2002 | Weng | 6,979,959 B2 | 12/2005 | Henry |
| 6,359,393 | B1 | 3/2002 | Brown | 7,026,860 B1 | 4/2006 | Gheorghiu et al. |
| 6,362,577 | B1 | 3/2002 | Ito et al. | 7,057,611 B2 | 6/2006 | Lin et al. |
| 6,388,388 | B1 | 5/2002 | Weindorf et al. | 7,075,245 B2 | 7/2006 | Liu |
| 6,396,217 | B1 | 5/2002 | Weindorf | 7,095,392 B2 | 8/2006 | Lin |
| 6,396,722 | B2 | 5/2002 | Lin | 7,120,035 B2 | 10/2006 | Lin et al. |
| 6,417,631 | B1 | 7/2002 | Chen et al. | 7,151,394 B2 | 12/2006 | Gheorghiu et al. |
| 6,420,839 | B1 | 7/2002 | Chiang et al. | 7,183,724 B2 | 2/2007 | Ball |
| 6,424,100 | B1 | 7/2002 | Kominami et al. | 7,187,140 B2 | 3/2007 | Ball |
| 6,429,839 | B1 | 8/2002 | Sakamoto | 7,190,123 B2 | 3/2007 | Lee |
| 6,433,492 | B1 | 8/2002 | Buonavita | 7,202,458 B2 | 4/2007 | Park |
| 6,441,943 | B1 | 8/2002 | Roberts et al. | 7,233,117 B2 | 6/2007 | Wang et al. |
| 6,445,141 | B1 | 9/2002 | Kastner et al. | 7,236,020 B1 | 6/2007 | Virgil |
| 6,452,344 | B1 | 9/2002 | MacAdam et al. | 2001/0036096 A1 | 11/2001 | Lin |
| 6,459,215 | B1 | 10/2002 | Nerone et al. | 2002/0030451 A1 | 3/2002 | Moisin |
| 6,459,216 | B1 | 10/2002 | Tsai | 2002/0097004 A1 | 7/2002 | Chiang et al. |
| 6,469,922 | B2 | 10/2002 | Choi | 2002/0114114 A1 | 8/2002 | Schmitt |
| 6,472,827 | B1 | 10/2002 | Nilssen | 2002/0118182 A1 | 8/2002 | Weindorf |
| 6,472,876 | B1 | 10/2002 | Notohamiprodjo et al. | 2002/0130786 A1 | 9/2002 | Weindorf |
| 6,479,810 | B1 | 11/2002 | Weindorf | 2002/0135319 A1 | 9/2002 | Bruning et al. |
| 6,483,245 | B1 | 11/2002 | Weindorf | 2002/0140538 A1 | 10/2002 | Yer |
| 6,486,618 | B1 | 11/2002 | Li | 2002/0145886 A1 | 10/2002 | Stevens |
| 6,494,587 | B1 | 12/2002 | Shaw et al. | 2002/0153852 A1 | 10/2002 | Liao et al. |
| 6,495,972 | B1 | 12/2002 | Okamoto et al. | 2002/0171376 A1 | 11/2002 | Rust et al. |
| 6,501,234 | B2 | 12/2002 | Lin et al. | 2002/0180380 A1 | 12/2002 | Lin |
| 6,507,286 | B2 | 1/2003 | Weindorf et al. | 2002/0180572 A1 | 12/2002 | Kakehashi et al. |
| 6,509,696 | B2 | 1/2003 | Bruning et al. | 2002/0181260 A1 | 12/2002 | Chou et al. |
| 6,515,427 | B2 | 2/2003 | Oura et al. | 2002/0195971 A1 | 12/2002 | Qian et al. |
| 6,515,881 | B2 | 2/2003 | Chou et al. | 2003/0001524 A1 | 1/2003 | Lin et al. |
| 6,521,879 | B1 | 2/2003 | Rand et al. | 2003/0020677 A1 | 1/2003 | Nakano |

| | | |
|---|---|---|
| 2003/0025462 A1 | 2/2003 | Weindorf |
| 2003/0080695 A1 | 5/2003 | Ohsawa |
| 2003/0090913 A1 | 5/2003 | Che-Chen et al. |
| 2003/0117084 A1 | 6/2003 | Stack |
| 2003/0141829 A1 | 7/2003 | Yu |
| 2003/0161164 A1 | 8/2003 | Shannon et al. |
| 2003/0227435 A1 | 12/2003 | Hsieh |
| 2004/0000879 A1 | 1/2004 | Lee |
| 2004/0012556 A1 | 1/2004 | Yong et al. |
| 2004/0017348 A1 | 1/2004 | Numao |
| 2004/0032223 A1 | 2/2004 | Henry |
| 2004/0051473 A1 | 3/2004 | Jales et al. |
| 2004/0145558 A1 | 7/2004 | Cheng |
| 2004/0155596 A1 | 8/2004 | Ushijima |
| 2004/0155853 A1 | 8/2004 | Lin |
| 2004/0189217 A1 | 9/2004 | Ishihara et al. |
| 2004/0257003 A1 | 12/2004 | Hsieh et al. |
| 2004/0263092 A1 | 12/2004 | Liu |
| 2005/0062436 A1 | 3/2005 | Jin |
| 2005/0093471 A1 | 5/2005 | Jin |
| 2005/0093472 A1 | 5/2005 | Jin |
| 2005/0093482 A1 | 5/2005 | Ball |
| 2005/0093483 A1 | 5/2005 | Ball |
| 2005/0093484 A1 | 5/2005 | Ball |
| 2005/0094372 A1 | 5/2005 | Lai |
| 2005/0099143 A1 | 5/2005 | Kohno |
| 2005/0156536 A1 | 7/2005 | Ball |
| 2005/0156539 A1 | 7/2005 | Ball |
| 2005/0156540 A1 | 7/2005 | Ball |
| 2005/0162098 A1 | 7/2005 | Ball |
| 2005/0218825 A1 | 10/2005 | Chiou |
| 2005/0225261 A1 | 10/2005 | Jin |
| 2006/0022612 A1 | 2/2006 | Henry |
| 2006/0049959 A1 | 3/2006 | Sanchez |
| 2006/0158136 A1 | 7/2006 | Chen |

FOREIGN PATENT DOCUMENTS

| | | |
|---|---|---|
| EP | 0587923 | 3/1994 |
| EP | 0597661 | 5/1994 |
| EP | 0647021 | 9/1994 |
| JP | 06168791 | 6/1994 |
| JP | 8-204488 | 8/1996 |
| KR | 10-2003-0075461 | 10/2003 |
| TW | 554643 | 9/2003 |
| TW | 8-204488 | 12/2003 |
| TW | 200501829 | 1/2005 |
| WO | WO 94/15444 | 7/1994 |
| WO | WO 98/09369 | 3/1998 |
| WO | WO 9941953 | 8/1999 |
| WO | WO 0237904 | 5/2002 |

OTHER PUBLICATIONS

Coles, Single Stage CCFL Backlight Resonant Inverter using PWM Dimming Methods, 1998, pp. 35-38.
Declaration of Charles Coles filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.
Declaration of Dean G. Dunlavey filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.
Declaration of Defendant/Counterclaimant Monolithic Power Systems, Inc.'s Expert Witness, Dr. Douglas C. Hopkins, In Support of Its Motion for Summary Judgment of Invalidity of Asserted Claims of U. S. Patent No. 6,198,234, dated Nov. 14, 2005.
Declaration of Doyle Slack filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.
Declaration of Henry C. Su in Support of Plaintiff 02 Micro International Limited's Brief in Response to Third-Party Defendant Microsemi Corporation's Brief Re Claim Construction for U.S. Patent Nos. 5,930,121 and 6,198,234, dated Oct. 26, 2007.
Declaration of Irfan A. Lateef in Support of Third-Party Defendant Microsemi Corporation's Brief in Support of its Claim Construction for U.S. Patent Nos. 5,930,121 and 6,198,234, dated Oct. 19, 2007.
Declaration of John A. O'Connor filed by Defendant/Counterclaimant Monolithic Power Systems, Inc.'s in Support of Its Motion for Summary Judgment of Invalidity of Asserted Claims of U. S. Patent No. 6,198,234, dated Nov. 14, 2005.
Declaration of Robert Mammano filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.
Defendant/Counterclaimant Monolithic Power Systems, Inc.'s Memorandum of Points and Authorities in Support of Motion for Summary Judgment of Invalidity of Asserted Claims of U. S. Patent No. 5,615,093, dated Nov. 14, 2005.
Defendant/Counterclaimant Monolithic Power Systems, Inc.'s Memorandum of Points and Authorities in Support of Motion for Summary Judgment of Invalidity of Asserted Claims of U. S. Patent No. 6,198,234, dated Nov. 14, 2005.
Defendant/Counterclaimant Monolithic Power Systems, Inc.'s Notice of Motion and Motion for Summary Judgment of Invalidity of Asserted Claims of U. S. Patent No. 5,615,093, dated Nov. 14, 2005.
Defendant/Counterclaimant Monolithic Power Systems, Inc.'s Notice of Motion and Motion for Summary Judgment of Invalidity of Asserted Claims of U. S. Patent No. 6,198,234, dated Nov. 14, 2005.
Defendant/Counterclaimant Monolithic Power Systems, Inc.'s Reply Brief in Support of Motion for Summary Judgment of Invalidity of Asserted Claims of U. S. Patent No. 5,615,093, dated Mar. 13, 2006.
Defendant/Counterclaimant Monolithic Power Systems, Inc.'s Reply Brief in Support of Motion for Summary Judgment of Invalidity of Asserted Claims of U. S. Patent No. 6,198,234, dated Mar. 13, 2006.
Dubey, G. K., "Thyristorised Power Controllers"; Halsted Press, 1986; pp. 74-77.
Goodenough, Frank, DC-to-AC Inverter Ups CCFL Lumens Per Watt, Electronic Design, Jul. 10, 1995, pp. 143-148.
IEEE Publication, "Dual Switched Mode Power Converter": Pallab Midya & Fred H. Schlereth; p. 155 1989.
IEEE Publication, "High Frequency Resonant Inverter For Group Dimming Control of Fluorescent Lamp Lighting Systems", K.H. Jee, et al., 1989 149-154.
Int. J. Electronics, "New soft-switching inverter for high efficiency electronic ballast with simple structure" E.C. Nho, et al., 1991, vol. 71, No. 3, 529-541.
Jordan et al., Resonant Fluorescent Lamp Converter Provides Efficient and Compact Solution, Mar. 1993, pp. 424-431.
Micro Linear, ML4878 Single-Stage CCFL Backlight Resonant Inverter, Application Note 68, May 1998, pp. 1-12.
Nguyen, Don J., "Optimizing Mobile Power Delivery". Presented at Intel Developers Forum, Fall 2001, p. 4.
O'Connor, J., Dimmable Cold-Cathode Fluorescent Lamp Ballast Design Using the UC3871, Application Note U-148, pp. 1-15,1995.
PCT International Search Report and Written Opinion mailed Apr. 8, 2008, Appl. No. PCT/US2007/072862 in 12 pages.
Plaintiff Microsemi Corporation's Opposition to Defendant/Counterclaimant Monolithic Power Systems, Inc.'s Motion for Summary Judgment of Invalidity of Asserted Claims of U.S. Patent No. 5,615,093, dated Feb. 13, 2006.
Plaintiff Microsemi Corporation's Opposition to Defendant/Counterclaimant Monolithic Power Systems, Inc.'s Motion for Summary Judgment of Invalidity of Asserted Claims of U.S. Patent No. 6,198,234, dated Feb. 13, 2006.
Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 5,615,093, dated Feb. 13, 2006.
Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 6,198,234, dated Feb. 13, 2006.
Plaintiff O2 Micro International Limited's Brief in Response to Third-Party Defendant Microsemi Corporation's Brief Re Claim Construction for U.S. Patent Nos. 5,930,121 and 6,198,234, dated Oct. 26, 2007.

Plaintiff O2 Micro International Limited's Preliminary Invalidity Contentions re Third-Party Defendant Microsemi Corporation Patents, dated Sep. 14, 2007.

Supplemental Declaration of Dean G. Dunlavey filed by Defendant/Counterclaimant Monolithic Power Systems, Inc.'s In Support of Its Motion for Summary Judgment of Invalidity of Asserted Claims of U.S. Patent No. 6,198,234, dated Mar. 13, 2006.

Tannas, Lawrence, "Flat Panel Displays and CRTs". © 1985 Van Nostrand Reinhold Company Inc., pp. 96-99.

Third-Party Defendant Microsemi Corporation's Brief in Support of its Claim Construction for U.S. Patent Nos. 5,930,121 and 6,198,234, dated Oct. 19, 2007.

UNITRODE Datasheet, Resonant Fluorescent Lamp Driver, UC 1871/2871/3871, May 1993, pp. 1-6.

UNITRODE Datasheet, Resonant Fluorescent Lamp Driver, UC 1871/2871/3871, Oct. 1994, pp. 1-6.

UNITRODE Product & Applications Handbook 1993-94, U-141, Jun. 1993, pp. i-ii; 9-471-9-478.

Williams, B.W.; "Power Electronics Devices, Drivers, Applications and Passive Components"; Second Edition, McGraw-Hill, 1992; Chapter 10, pp. 218-249.

Williams, Jim, Techniques for 92% Efficient LCD Illumination, Linear Technology Application Note 55, Aug. 1993.

* cited by examiner

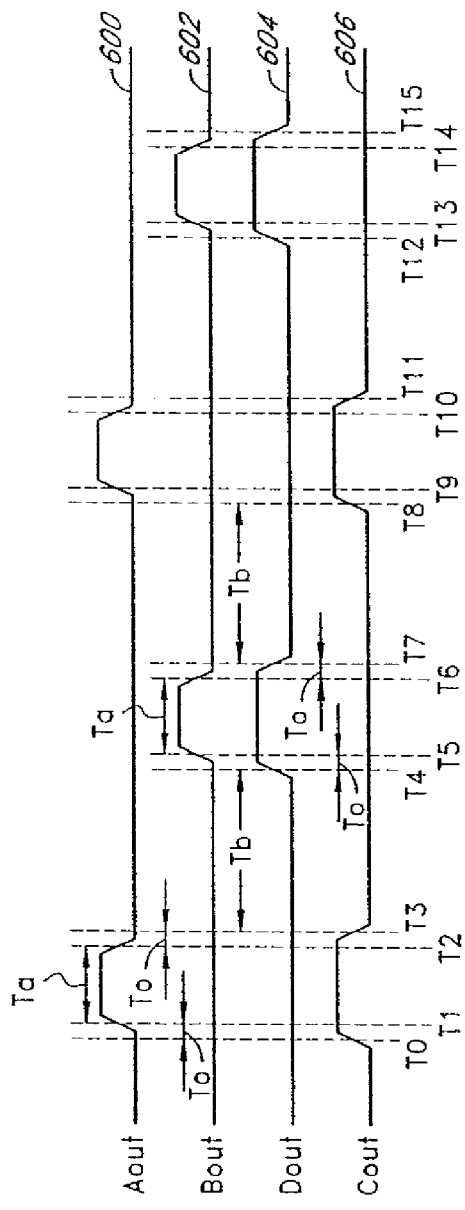
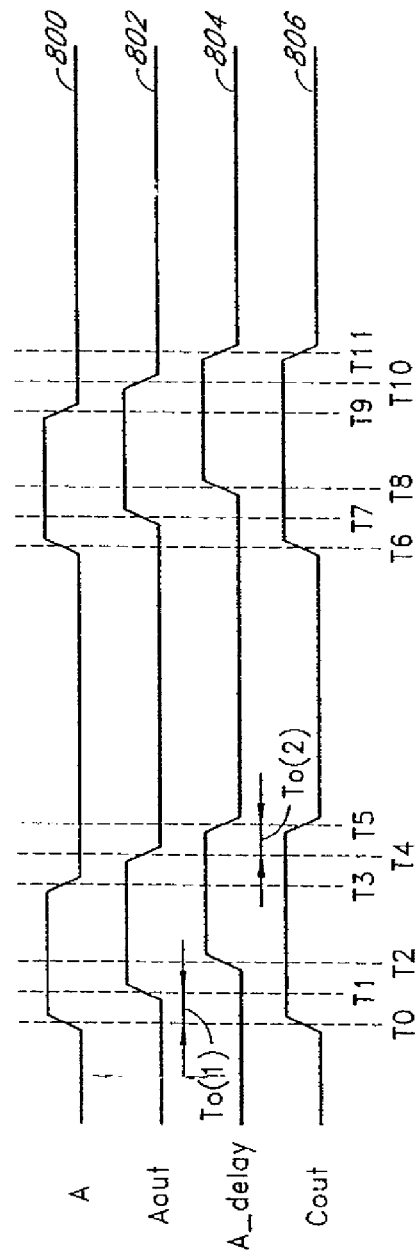
FIG. 6
FIG. 8

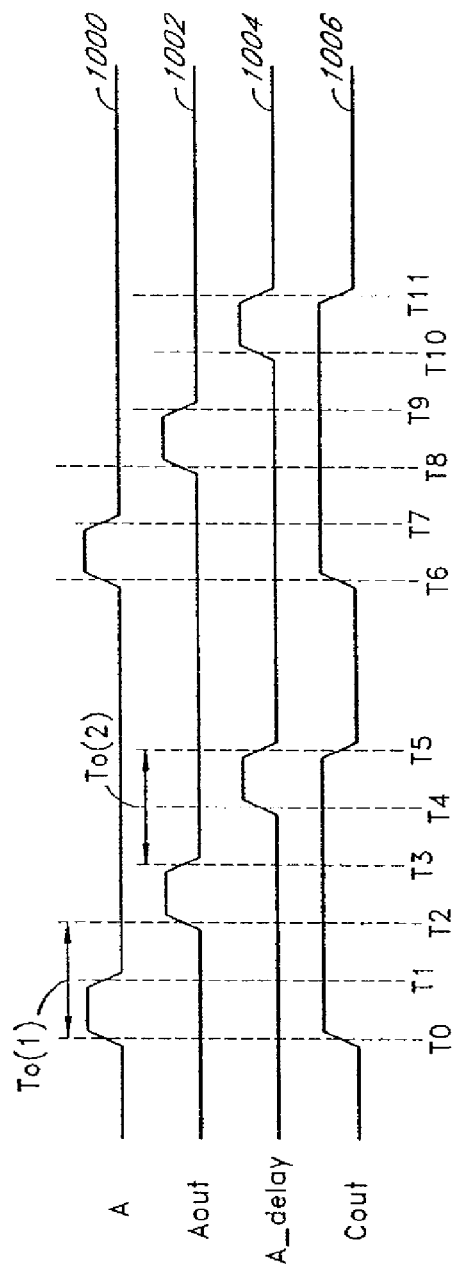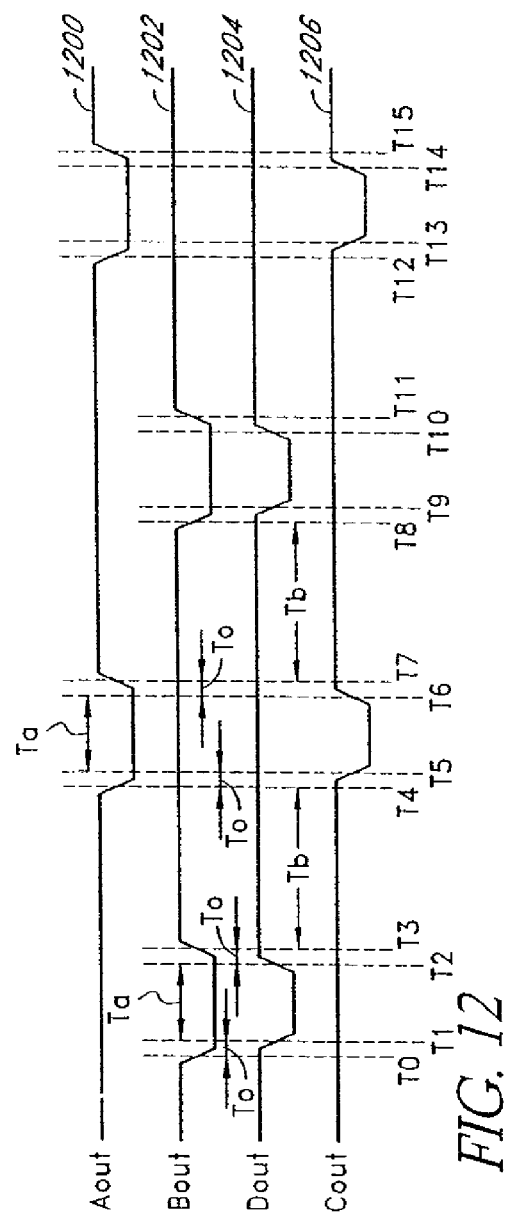

US 7,965,046 B2

FULL-BRIDGE AND HALF-BRIDGE COMPATIBLE DRIVER TIMING SCHEDULE FOR DIRECT DRIVE BACKLIGHT SYSTEM

CLAIM FOR PRIORITY

This application is a divisional of U.S. patent application Ser. No. 11/526,324, filed on Sep. 25, 2006 and entitled "Full-Bridge and Half-Bridge Compatible Driver Timing Schedule for Direct Drive Backlight System," now U.S. Pat. No. 7,646,152, which is a continuation of U.S. patent application Ser. No. 11/090,246, filed on Mar. 25, 2005 and entitled "Full-Bridge and Half-Bridge Compatible Driver Timing Schedule for Direct Drive Backlight System," now U.S. Pat. No. 7,112,929, which claims the benefit of priority under 35 U.S.C. §119(e) of U.S. Provisional Application No. 60/558,512, filed on Apr. 1, 2004 and entitled "Full-Bridge and Half-Bridge Compatible Driver Timing Schedule for Direct Drive Backlight System," each of which is hereby incorporated by reference herein in their entirety.

BACKGROUND

1. Field of the Invention

The invention generally relates to a driver circuit in a backlight system for powering fluorescent lamps, and more particularly, relates to a driver circuit with a power efficient timing schedule that can flexibly drive either a half-bridge or a hill-bridge switching network in the backlight system.

2. Description of the Related Art

Fluorescent lamps are used in a number of applications where light is required but the power required to generate the light is limited. One particular type of fluorescent lamp is a cold cathode fluorescent lamp (CCFL). CCFLs are used for back or edge lighting of liquid crystal displays (LCDs) which are typically found in notebook computers, web browsers, automotive and industrial instrumentation, and entertainment systems.

A power converter (e.g., an inverter) is typically used to power a fluorescent lamp. The inverter includes a controller and a switching network to convert a direct current (DC) source into an alternating current (AC) source to power the fluorescent lamp. In a half-bridge switching network, a pair of transistors is coupled to the DC source and the transistors alternately conduct to generate the AC source. In a full-bridge switching network, an arrangement of four transistors is coupled to the DC source and the transistors conduct in pairs to generate the AC source. The controller controls transistors in the switching network. Controllers designed for half-bridge switching networks typically cannot operate full-bridge switching networks, and controllers designed for full-bridge switching networks typically do not have outputs compatible for operating half-bridge networks.

SUMMARY

Embodiments advantageously include driver circuits (or controllers) that can switch between half-bridge and full-bridge operations without modification, redundant circuitry or additional components. In one embodiment, a controller for flexibly driving a half-bridge or a full-bridge switching network in a backlight inverter includes four outputs. A first output of the controller provides a first driving signal with periodic active and inactive states. A second output of the controller provides a second driving signal with active states that are phase shifted by approximately 180° with respect to the active states of the first driving signal. The first and the second driving signals have variable and substantially identical duty cycles that determine relative durations of the active and the inactive states.

A third output of the controller provides a third driving signal that substantially follows the first driving signal with opposite states and transition overlaps. For example, the first driving signal and the third driving signal are alternately active with overlapping inactive states during state transitions. The third driving signal transitions from an active state to an inactive state before the first driving signal transitions from an inactive state to an active state. The third driving signal also transitions from an inactive state to an active state after the first driving signal transitions from an active state to an inactive state.

A fourth output of the controller provides a fourth driving signal that substantially follows the second driving signal with opposite states and transitions overlaps. For example, the second driving signal and the fourth driving signal are alternately active with overlapping inactive states during state transitions. The fourth driving signal transitions from an active state to an inactive state before the second driving signal transitions from an inactive state to an active state. The fourth driving signal also transitions from an inactive state to an active state after the second driving signal transitions from an active state to an inactive state.

In one embodiment, a first semiconductor switch (or power transistor) and a second semiconductor switch are arranged in a half-bridge switching network of a direct-drive inverter. For example, the semiconductor switches are coupled between ground and respective opposite terminals of a primary winding of a transformer. A power source (e.g., a supply voltage or a current source) is coupled to a center tap of the primary winding of the transformer. A lamp load (e.g., one or more fluorescent lamps or cold cathode fluorescent lamps) is coupled across a secondary winding of the transformer.

The semiconductor switches (e.g., N-type transistors) in the half-bridge switching network can be advantageously controlled by the first driving signal and the second driving signal to generate an AC signal for powering the lamp load. For example, the first driving signal and the second driving signal cause the first semiconductor switch and the second semiconductor switch to alternately conduct. Power flows from the power source to the lamp load in a first polarity when the first semiconductor switch is on and the second semiconductor switch is off. Power flows from the power source to the lamp load in a second polarity when the second semiconductor switch is on and the first semiconductor switch is off. Substantially no power flows from the power source to the lamp load when both semiconductor switches are on or off.

In one embodiment, four semiconductor switches are coupled to a primary winding of a transformer in a full-bridge configuration. The four driving signals respectively control the four semiconductor switches to generate an AC lamp signal for powering a lamp load coupled across a secondary winding of the transformer. For example, the first driving signal controls the first semiconductor switch coupled between a first terminal of the primary winding and ground. The second driving signal controls the second semiconductor switch coupled between a second terminal of the primary winding and ground. The third driving signal controls the third semiconductor switch coupled between a power source and the first terminal of the primary winding. Finally, the fourth driving signal controls the fourth semiconductor switch coupled between the power source and the second terminal of the primary winding.

The four driving signals establish a periodic timing sequence that advantageously improves power efficiency. For example, the transition overlaps between the first and the third driving signals and the transitions overlaps between the second and the fourth driving signals facilitate reduced-voltage (or zero-voltage) switching to improve power efficiency. Conduction states and idles states are interposed between the different transition overlaps in the periodic timing sequence. For example, a first conduction state allows power to flow from the power source to the lamp load in a first polarity when the first and the fourth semiconductor switches are on while the second and the third semiconductor switches are off. A second conduction state allows power to flow from the power source to the lamp load in an opposite polarity when the first and the fourth semiconductor switches are off while the second and the third semiconductor switches are on. Substantially no power is provided by the power source during the idle states in which the first and the second semiconductor switches are on or the third and the fourth semiconductor switches are on.

In one embodiment, the first and the second semiconductor switches are N-type field-effect-transistors (NFETs) while the third and the fourth semiconductor switches are P-type FETs (PFETs). Thus, the active states of the first and the second driving signals correspond to logic high while the active states of the third and the fourth driving signals correspond to logic low. The third and the fourth driving signals have rising edges that precede respective rising edges of the first and the second driving signals by a first duration. The third and the fourth driving signals have falling edges that trail respective falling edges of the first and the second driving signals by a second duration.

In one embodiment, the four driving signals are generated from a pair of input signals and four delay circuits. For example, a first input signal is provided to a first delay circuit that is coupled in series with a second delay circuit. A second input signal is provided to a third delay circuit that is coupled in series with a fourth delay circuit.

In one application in which the first and the second driving signals have overlapping inactive states, the first delay circuit outputs the first driving signal. An output of the second delay circuit is ORed with the first input signal to generate the third driving signal. The third delay circuit outputs the second driving signal. An output of the fourth delay circuit is ORed with the second input signal to generate the fourth driving signal.

In another application in which the first and the second driving signals have overlapping inactive states, the first delay circuit outputs the first driving signal. The output of the second delay circuit is provided to a first edge-triggered one-shot circuit that has an output coupled to a reset terminal of a first SR latch. The first input signal is provided to a set terminal of the first SR latch. The first SR latch outputs the third driving signal. The third delay circuit outputs the second driving signal. The output of the fourth delay circuit is provided to a second edge-triggered one-shot circuit that has an output coupled to a reset terminal of a second SR latch. The second input signal is provided to a set terminal of the second SR latch. The second SR latch outputs the fourth driving signal.

In one application in which the first and the second driving signals have overlapping active states, the output of the first delay circuit is inverted to generate the fourth driving signal. The output of the second delay circuit is NORed with the first input signal to generate the second driving signal. The output of the third delay circuit is inverted to generate the third driving signal. The output of the fourth delay circuit is NORed with the second input signal to generate the first driving signal.

In another application in which the first and the second driving signals have overlapping active states, the output of the first delay circuit is inverted to generate the fourth driving signal. The output of the second delay circuit is provided to a first one-shot circuit that has an output coupled to a reset terminal of a first latch. The first input signal is coupled to a set terminal of the first latch. The first latch generates the second driving signal. The output of the third delay circuit is inverted to generate the third driving signal. The output of the fourth delay circuit is provided to a second one-shot circuit that has an output coupled to a reset terminal of a second latch. The second input signal is provided to a set terminal of the second latch. The second latch generates the first driving signal.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

FIG. 6 illustrates one embodiment of driving waveforms to control transistors in a full-bridge switching network in accordance with the periodic timing sequence depicted in FIGS. 5(a)-5(h).

FIG. 8 is a timing diagram for some signals in the controller circuit of FIG. 7.

FIG. 10 is a timing diagram for some signals in the controller circuit of FIG. 9.

FIG. 12 illustrates one embodiment of driving waveforms to control transistors in a full-bridge switching network in accordance with the periodic timing sequence depicted in FIGS. 11(a)-11(h).

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
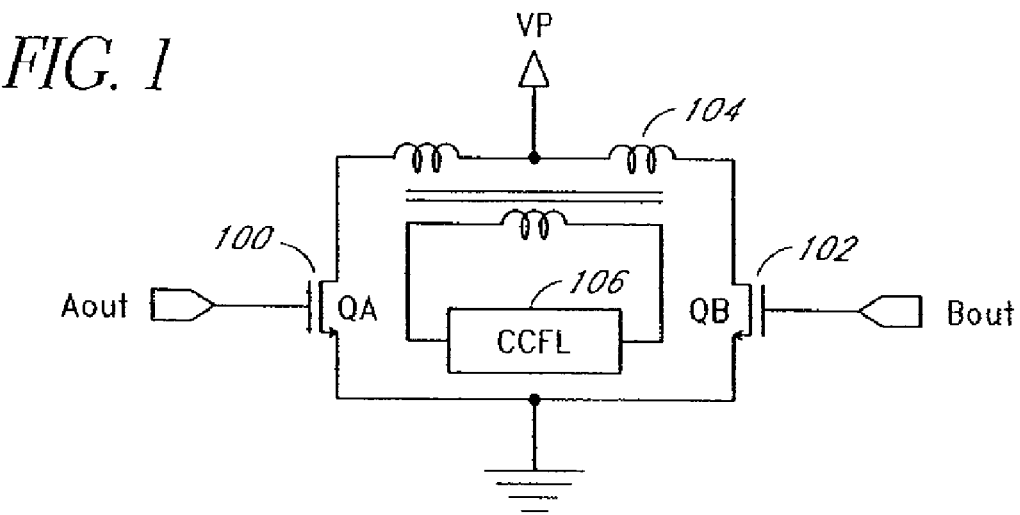
FIG. 1 illustrates one embodiment of a direct drive backlight system implemented with a half-bridge switching network.

FIG. 1 illustrates one embodiment of a direct drive backlight system implemented with a half-bridge switching network. Two power transistors (or semiconductor switches) 100, 102 are coupled between circuit ground and respective opposite terminals of a primary winding of a transformer 104. A power source (VP) is coupled to a center tap of the primary winding of the transformer 104. The power source can be a supply voltage or a current source. A lamp load 106 is coupled across a secondary winding of the transformer 104. The lamp load 106 can include one or more lamps, such as fluorescent lamps or CCFLs. Other half-bridge network configurations including two power transistors are also possible and may exclude a transformer for coupling to a lamp load.

A controller (not shown) outputs two driving signals to control the semiconductor switches 100, 102. For example, the first driving signal (Aout) controls the first semiconductor switch (QA) 100 and the second driving signal (Bout) controls the second semiconductor switch (QB) 102. The driving signals configured the semiconductor switches 100, 102 to alternately conduct to establish an AC current in the primary winding and the second winding of the transformer 104. In a first conduction state, power flows from the power source (or supply source) to the lamp load 106 in a first polarity when the first semiconductor switch 100 is on and the second semiconductor switch 102 is off. In a second conduction state, power flows from the power source to the lamp load 106 in a second (or opposite) polarity when the second semiconductor switch 102 is on and the first semiconductor switch 100 is off. Idle (or power-of) states can be inserted in between the conduction states. During the idle states, the semiconductor switches 100, 102 are both on (e.g., if the power source is a current source) or both off (e.g., if the power source is a voltage source) and substantially no power flows from the power source to the lamp load 106.

Figure 2:
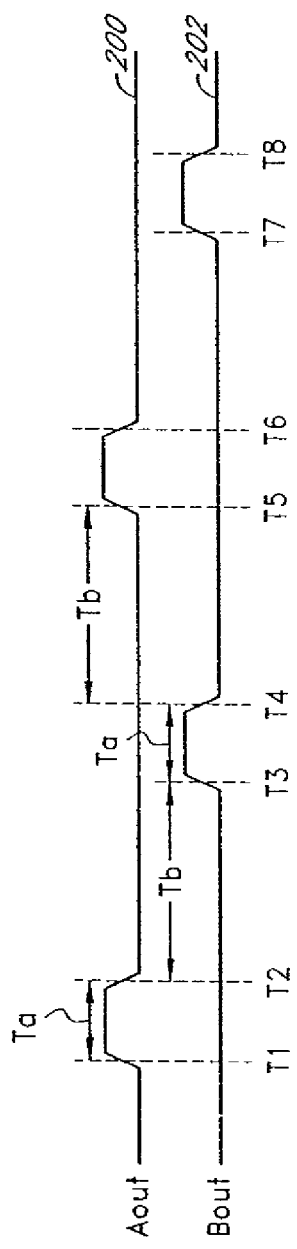
FIG. 2 illustrates one timing scheme for driving power transistors in the half-bridge switching network of FIG. 1.

FIG. 2 illustrates one timing scheme for driving (or controlling conduction states of) the power transistors 100, 102 in the half-bridge switching network of FIG. 1. In the embodiment shown in FIG. 1, the power transistors 100, 102 are NFETs with driving signals coupled to respective gate terminals of the power transistors 100, 102. Logic high in the driving signals corresponds to turning on the power transistors 100, 102 (or an active state) while logic low in the driving signals corresponds to turning off the power transistors 100, 102 (or an inactive state).

A graph 200 illustrates a first driving signal (Aout) with respect to time for driving the first power transistor 100. A graph 202 illustrates a second driving signal (Bout) with respect to time for driving the second power transistor 102. The driving signals are periodically and alternately active (or logic high) for a first predetermined duration (Ta). For example, the first driving signal is active for the first predetermined duration during times T1-T2 and T5-T6. The second driving signal is active for the first predetermined duration during times T3-T4 and T7-T8. Rest periods of a second predetermined duration (Tb) are inserted in between the alternate active states of the driving signals (e.g., during times T2-T3, T4-T5 and T6-T7). The driving signals are both inactive (or logic low) during the rest periods. Alternately, the driving signals can be both active during the rest periods.

Thus, the power transistors 100, 102 alternately switch on (or conduct) between periods of rest using the timing scheme illustrated in FIG. 2. Power flows from the power source to the lamp load 106 in a first polarity when the first driving signal is active. Power flows from the power source to the lamp load 106 in a second polarity when the second driving signal is active. Substantially no power flows from the power source to the lamp load 106 when the first and the second driving signals are both active or both inactive. The alternating conduction by the power transistors 100, 102 between the rest periods results in a substantially AC waveform for powering the lamp load 106. An AC current (or lamp current) flows through a lamp in the lamp load 106 to illuminate the lamp. The brightness or effective power delivered to the lamp is dependent on the power source and switching duty-cycle (i.e., Ta/Tb).

Figure 3:
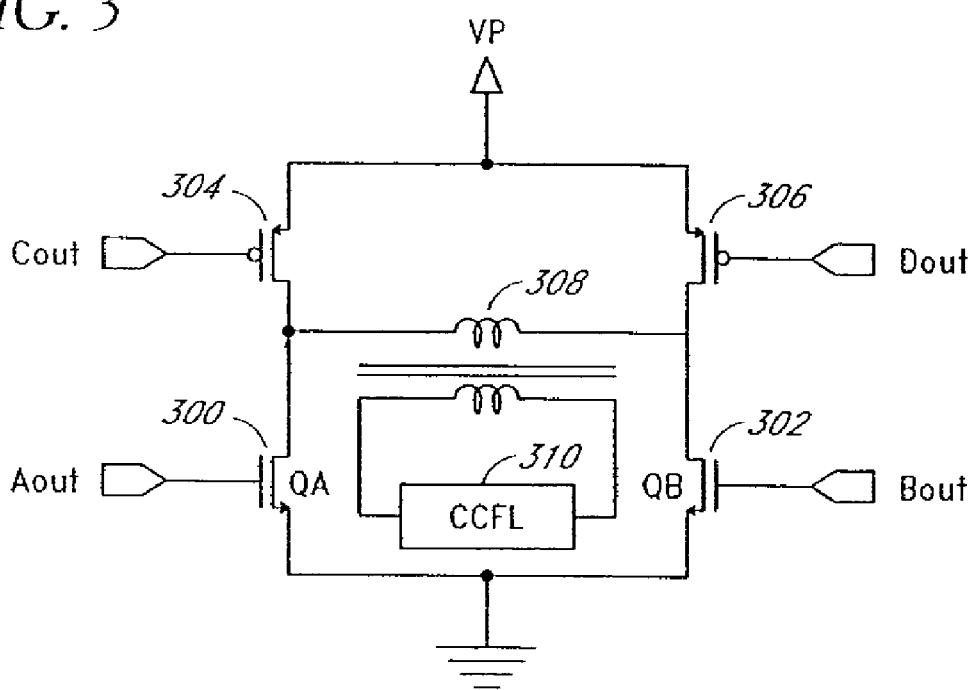
FIG. 3 illustrates one embodiment of a direct drive backlight system implemented with a full-bridge switching network.

FIG. 3 illustrates one embodiment of a direct drive backlight system implemented with a full-bridge (or H-bridge) switching network. Four power transistors 300, 302, 304, 306 are coupled to a primary winding of a transformer 308. For example, a first pair of power transistors (QA, QB) 300, 302 is coupled between respective opposite terminals of the primary winding and circuit ground. A second pair of power transistors (QC, QD) 304, 306 is coupled between the respective opposite terminals of the primary winding and a power source (VP) to complete the H-bridge switching network. A lamp load (e.g., a fluorescent lamp) 310 is coupled across a secondary winding of the transformer 308.

Four driving signals (Aout, Bout, Cout, Dout) respectively control the four power transistors 300, 302, 304, 306 to generate an AC lamp signal for powering the lamp load 310 coupled across the secondary winding of the transformer 308. For example, the first driving signal (Aout) controls the first power transistors (QA) 300 coupled between a first terminal of the primary winding and ground. The second driving signal (Bout) controls the second power transistor (QB) 302 coupled between a second terminal of the primary winding and ground. The third driving signal (Cout) controls the third power transistor (QC) 304 coupled between the power source and the first terminal of the primary winding. Finally, the fourth driving signal (Dout) controls the fourth power transistor (QD) 306 coupled between the power source and the second terminal of the primary winding.

A full-bridge switching network has some advantages over a half-bridge switching network. For example, the transformer 308 of FIG. 3 generally costs less than the transformer 104 of FIG. 1 due to reduced primary-to-secondary turns ratio and lack of a center tap. Power transistors used in the full-bridge switching network generally cost less than power transistors used in the half-bridge switching network due to reduced breakdown voltage requirement. The power transistors in the half-bridge switching network have a breakdown voltage that is comparable to at least twice a supply voltage while the power transistors in the full-bridge switching network have a breakdown voltage that is comparable to at least the supply voltage.

Figure 4:
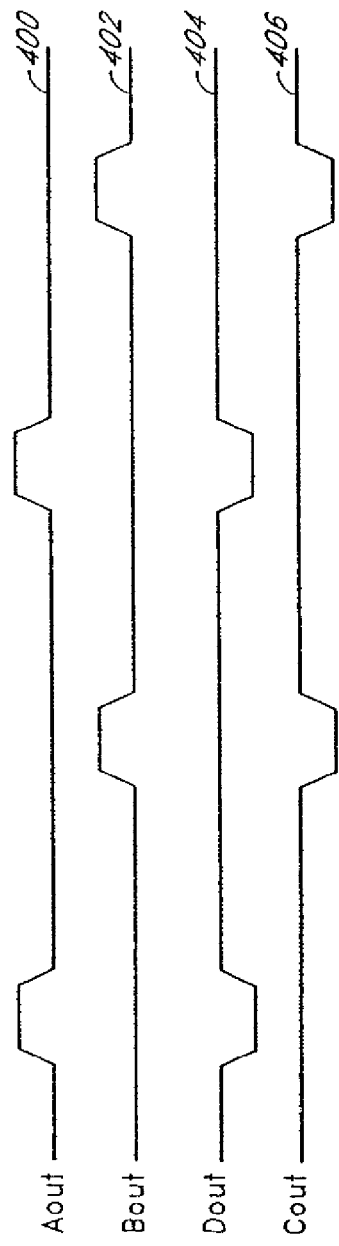
FIG. 4 illustrates one timing scheme for controlling power transistors in the full-bridge switching network of FIG. 3.

FIG. 4 illustrates one timing scheme for controlling the power transistors 300, 302, 304, 306 in the full-bridge switching network of FIG. 3. In the embodiment shown in FIG. 3, the first pair of power transistors 300, 302 are NFETs and the second pair of power transistors 304, 306 are PFETs. The driving signals (Aout, Bout, Cout, Dout) are coupled to respective gate terminals of the power transistors 300, 302, 304, 306. Logic high in the first two driving signals (Aout, Bout) corresponds to turning on the first pair of power transistors 300, 302 (or an active state). Logic low in the last two driving signals (Cout, Dout) corresponds to turning on the second pair of power transistors 304, 306 (or an active state).

A graph 400 illustrates the first driving signal (Aout) with respect to time for driving the first power transistor 300. A graph 402 illustrates the second driving signal (Bout) with respect to time for driving the second power transistor 302. A graph 404 illustrates the fourth driving signal (Dout) with respect to time for driving the fourth power transistor 306. A graph 406 illustrates the third driving signal (Cout) with respect to time for driving the third power transistor 304. The first and the second driving signals illustrated in FIG. 4 is substantially similar to the driving signals illustrated in FIG. 2 for the half-bridge switching network. The fourth driving signal is an inverted form of the first driving signal, and the third driving signal is an inverted form of the second driving signal. Thus, the first and the fourth power transistors 300, 306 are switched on and off at approximately the same times while the second and the third power transistors 302, 304 are switched on and off at approximately the same times.

Referring to FIG. 3, current flows from the second terminal to the first terminal of the primary winding of the transformer 308 and power transfers from the power source to the lamp load 310 in a first polarity during first conduction states when the first driving signal is logic high (or active) and the fourth driving signal is logic low (or active). Current flows from the first terminal to the second terminal of the primary winding of the transformer 308 and power transfers from the power source to the lamp load 310 in a second polarity during second conduction states when the second driving signal is logic high (or active) and the third driving signal is logic low (or active). Substantially no power transfers from the power source to the lamp load 310 during idle states when the first and the second driving signals are both inactive (or logic low) as shown in FIG. 4.

FIGS. 5(a)-5(h) illustrate one embodiment of a periodic timing sequence for the full-bridge switching network of FIG. 3 that employs a zero-voltage switching technique to generate an AC lamp signal for powering the lamp load 310 with improved power efficiency. The power transistors 300, 302, 304, 306 are represented by schematically equivalent single-pole-single-throw switches. The lamp load 310 coupled across the transformer 308 is not shown for clarity of illustration.

Figure 5A:
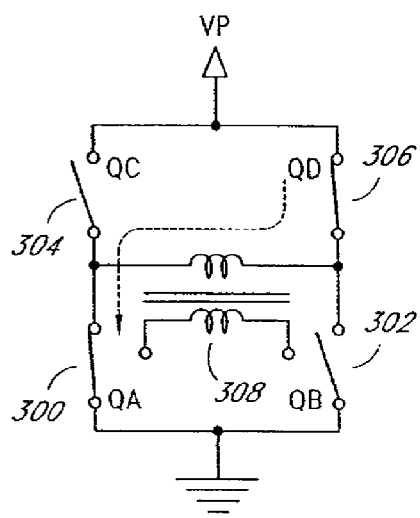
FIGS. 5(a)-5(h) illustrate one embodiment of a periodic timing sequence for a full-bridge switching network employing a zero-voltage switching technique to improve power efficiency.
Figure 5B:
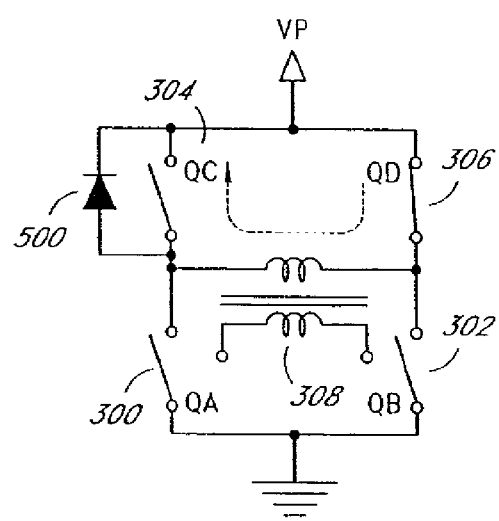
Figure 5C:
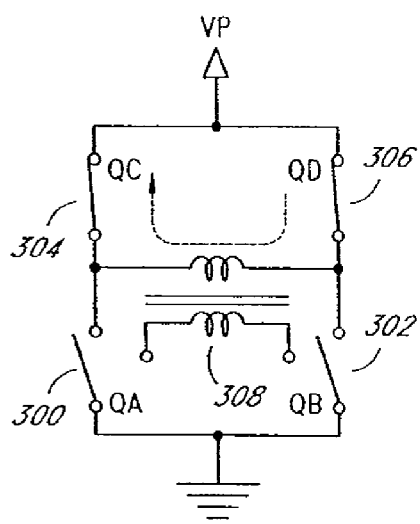
Figure 5D:
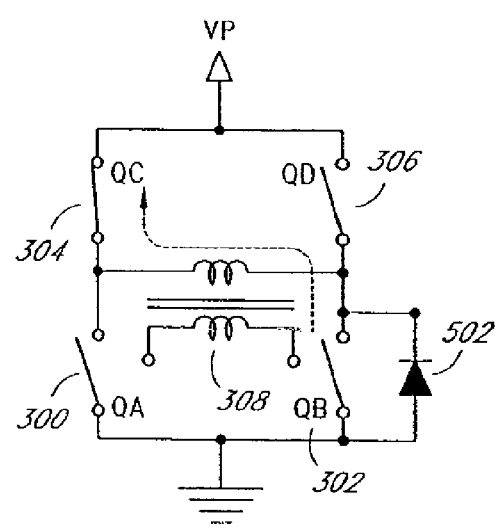

FIG. 5(a) illustrates a first conduction state (or step) in which the first power transistor (QA) 300 and the fourth power transistor (QD) 306 are on while the second power transistor (QB) 302 and the third power transistor (QC) 304 are off to allow power to flow from the power source (VP) to the lamp load 310 in a first polarity. For example, current flows from the power source through the fourth power transistor 306, through the primary winding of the transformer 308 and through the first power transistor 300 to ground during the first conduction state. FIGS. 5(b)-5(d) illustrate intermediate steps to transition from the first conduction state to a second conduction state illustrated in FIG. 5(e).

FIG. 5(b) shows a first transition state (or first intermediate step), following the first conduction state, in which the first power transistor 300 turns off. Because of leakage inductance associated with the transformer 308, the current through the primary winding of the transformer 308 does not stop instantaneously. The current flowing through the primary winding of the transformer 308 finds a path through a body diode 500 of the third power transistor 304 and back to the power source. The body diode 500 has an anode coupled to the first terminal of the primary winding and a cathode coupled to the power source. With the body diode 500 conducting, the drain-to-source voltage of the third power transistor 304 is relatively low (e.g., approximately 0.7 volt or one diode voltage drop).

FIG. 5(c) shows a first idle state (or second intermediate step), following the first transition state, in which the third power transistor 304 turns on. Turning on the third power transistor 304 after its body diode 500 starts conducting takes advantage of close to zero (or reduced) voltage switching to thereby reduce switching loss. It should be noted that although current continues to flow through the primary winding of the transformer 308 during the idle state, no power is drawn from the power source.

FIG. 5(d) shows a second transition state (or third intermediate step), following the first idle state, in which the fourth power transistor 306 turns off. Similar to the first transition step, the current flowing through the primary winding of the transformer 308 does not stop abruptly. The current flowing through the primary winding of the transformer 308 finds a path from ground through a body diode 502 of the second power transistor 302. The body diode 502 has an anode coupled to ground and a cathode coupled to the second terminal of the primary winding.

Figure 5E:
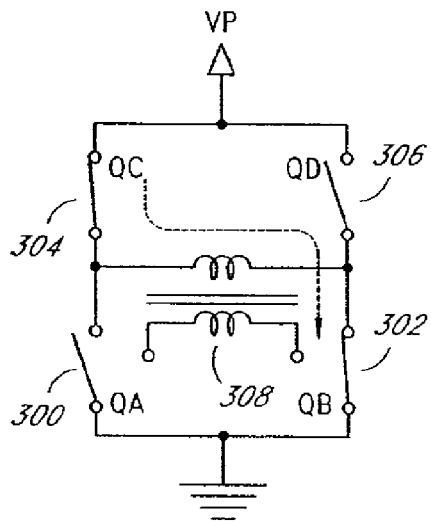

FIG. 5(e) shows the second conduction state, following the second transition state, in which the second power transistor 302 turns on to allow power to flow from the power source to the lamp load 310 in a second polarity. The second power transistor 302 turns on after its body diode 502 starts conducting to take advantage of reduced-voltage (or zero-voltage) switching. In the second conductions state, current flows from the power source through the third power transistor 304, through the primary winding of the transformer 308 and through the second power transistor 302 to ground. The current flows in opposite (or reverse) directions through the primary winding of the transformer 308 between the first and the second conduction states.

Figure 5F:
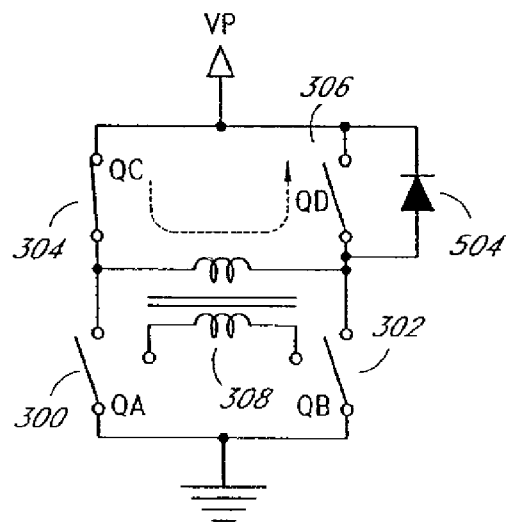
Figure 5G:
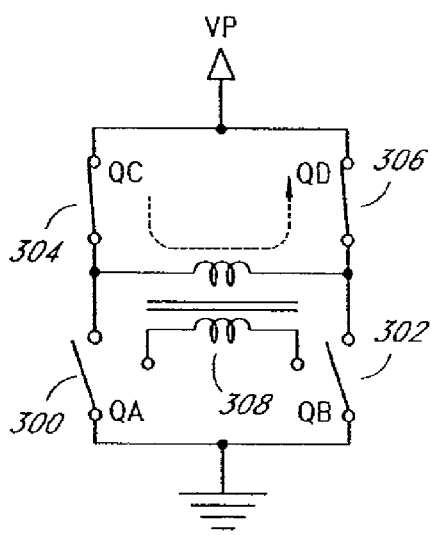
Figure 5H:
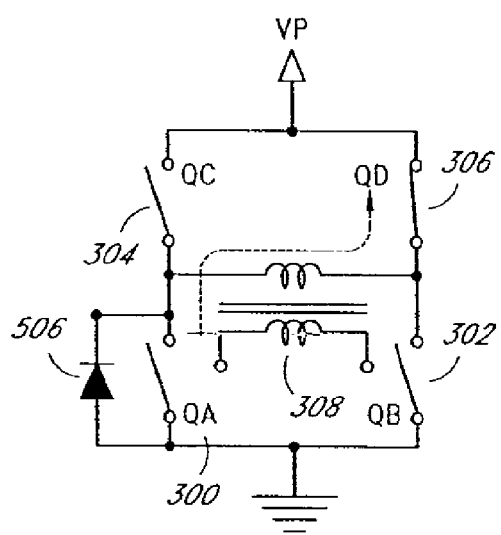

FIGS. 5(f)-5(h) illustrate another set of intermediate steps, following the same principles shown in FIG. 5(b)-5(d), to transition from the second conduction state back to the first conduction state. For example, FIG. 5(f) shows a third transition state, following the second conduction state, in which the second power transistor 302 turns off and the current flowing the primary winding of the transformer 308 finds a path to the power source through a body diode 504 of the fourth power transistor 306. The body diode 504 has an anode coupled to the second terminal of the primary winding and a cathode coupled to the power source. FIG. 5(g) shows a second idle state, following the third transition state, in which the fourth power transistor 306 turns on using zero-voltage switching.

FIG. 5(h) shows a fourth transition state, following the second idle state, in which the third power transistor 304 turns off and the current flowing through the primary winding of the transformer 308 finds a path to ground through a body diode 506 of the first power transistor 300. The body diode 506 has an anode coupled to ground and a cathode coupled to the first terminal of the primary winding. The first power transistor 300 turns on using zero-voltage switching in the next step of the periodic timing sequence to return to the first conduction state. The zero-voltage switching technique turns on (or closes) a power transistor (or switch) when the voltage across the power transistor (or source-to-drain voltage of a FET) is at a minimum (or reduced) voltage (e.g., 0.7 volt or substantially zero volt). The zero-voltage switching technique reduces switching power loss due to discharging of the drain-to-source capacitance associated with turning on the power transistor.

FIG. 6 illustrates one embodiment of driving waveforms to control transistors in a full-bridge switching network in accordance with the periodic timing sequence depicted in FIGS. 5(a)-5(h). For example, a controller includes four outputs to drive the full-bridge switching network in a backlight inverter. The controller can also flexibly drive a half-bridge switching network with two of the four outputs. The first output of the controller provides a first driving signal (Aout) with periodic active and inactive states. The first driving signal has a variable duty-cycle that determines relative durations of the active and the inactive states, which is one way to control backlight intensity (or amount of power provided to the lamp load 310). A graph 600 illustrates the first driving signal with respect to time. In one embodiment, the first driving signal controls the first power transistor 300 which is shown as an NFET with logic high corresponding to active states. The graph 600 shows the first driving signal with periodic active states of a first duration (Ta) (e.g, from times T1-T2 and T9-T10).

The second output of the controller provides a second driving signal (Bout) that has a substantially identical duty-cycle as the first driving signal and is substantially an 180° phase-shifted version of the first driving signal. In other words, the active states of the second driving signal are phased shifted by approximately 180° with respect to the active states of the first driving signal to provided complementary switching. A graph 602 illustrates the second driving signal with respect to time. In one embodiment, the second driving signal controls the second power transistor 302 which is shown as an NFET with logic high corresponding to active states. The graph 602 shows the second driving signal with periodic active states of the first duration (Ta) (e.g., from times T5-T6 and T13-T14). The active states of the second driving signal is phase shifted by 180° from (or occurs in between) the active states of the first driving signal. The first and the second driving signals can advantageously be used to control alternating conduction by switches in a half-bridge switching network.

The third output of the controller provides a third driving signal (Cout) that substantially follows (or tracks) the first driving signal with opposite (or opposing) states and transition overlaps. A graph 606 shows the third driving signal. In one embodiment, the third driving signal controls the third power transistor 304 which is shown as a PFET with logic low corresponding to active states. With opposing states, the first power transistor 300 and the third power transistor 304 are alternately on. With transition overlaps, the third power transistor 304 turns off before the first power transistor 300 turns on and the third power transistor 304 turns on after the first power transistor 300 turns off.

The graph 606 shows the third driving signal with periodic inactive states that exceed the first duration (e.g., from times T0-T3 and T8-T11). Thus, the third driving signal is substantially similar to the first driving signal except the leading (or rising) edge of the third driving signal precedes the leading edge of the first driving signal by a first overlapping duration and the trailing (or falling) edge of the third driving signal succeeds the trailing edge of the first driving signal after a second overlapping duration. In other words, the third driving signal transitions from an active state (i.e., logic low) to an inactive state (i.e., logic high) before the first driving signal transitions from an inactive state (i.e., logic low) to an active state (i.e., logic high). The third driving signal also transitions from an inactive state to an active state after the first driving signal transitions from an active state to an inactive state. During the first and the second overlapping durations, the first and the third driving signals are both in inactive states.

The fourth output of the controller provides a fourth driving signal (Dout) that substantially follows the second driving signal with opposite states and transition overlaps. A graph 604 shows the fourth driving signal. In one embodiment, the fourth driving signal controls the fourth power transistor 306 which is shown as a PFET with logic low corresponding to active states. With opposite states, the second power transistor 302 and the fourth power transistor 306 are alternately on. With transition overlaps, the fourth power transistor 306 turns off before the second power transistor 302 turns on and the fourth power transistor 306 turns on after the second power transistor 302 turns off.

The graph 604 shows the fourth driving signal with periodic inactive states that exceed the first duration (e.g., from times T4-T7 and T12-T15). Thus, the fourth driving signal is substantially similar to the second driving signal except the leading edge of the fourth driving signal precedes the leading edge of the second driving signal by a third overlapping duration and the trailing edge of the fourth driving signal succeeds the trailing edge of the second driving signal after a fourth overlapping duration. In other words, the fourth driving signal transitions from an active state (i.e., logic low) to an inactive state (i.e., logic high) before the second driving signal transitions from an inactive state (i.e., logic low) to an active state (i.e., logic high). The fourth driving signal also transitions from an inactive state to an active state after the second driving signal transitions from an active state to an inactive state. During the third and the fourth overlapping durations, the second and the fourth driving signals are both in inactive states. FIG. 6 shows the four overlapping durations to have substantially identical time lengths (i.e., To). However, each of the overlapping durations can be a different time length.

Referring to FIG. 6 in conjunction with FIGS. 5(a)-5(h), the period of overlapping active states between the first and the fourth driving signals (e.g., from time T1-T2 or T9-T10) corresponds to the first conduction state shown in FIG. 5(a). The trailing edge transition overlaps between the first and the third driving signals (e.g., from times T2-T3 and T10-T11) correspond to the first transition state shown in FIG. 5(b). The first period of overlapping inactive states (or first rest period) between the first and the second driving signals (e.g., from time T3-T4 or T11-T12) corresponds to the first idle state shown in FIG. 5(c). The leading edge transition overlaps between the second and the fourth driving signals (e.g., from times T4-T5 and T12-T13) correspond to the second transition state shown in FIG. 5(d). The period of overlapping active states between the second and the third driving signals (e.g., from time T5-T6 or T13-T14) corresponds to the second conduction state shown in FIG. 5(e). The trailing edge transition overlaps between the second and the fourth driving signals (e.g., from times T6-T7 and T14-T15) correspond to the third transition state shown in FIG. 5(f). The second period of overlapping inactive states (or second rest period) between the first and the second driving signals (e.g., from time T7-T8) corresponds to the second idle state shown in FIG. 5(g). Finally, the leading edge transition overlaps between the first and the third driving signals (e.g., from times T0-T1 and T8-T9) correspond to the fourth transition state shown in FIG. 5(h).

As discussed above, power is drawn from the power source and delivered to the lamp load 310 through the transformer 308 during the first and the second conduction states (or power-on states). No net current flows out of the power source during the first and the second idle states (or power-off states). In addition to facilitating power efficiency by reduced-voltage switching, the four transition states help avoid shoot-through current associated with the first power transistor 300 and the third power transistor 304 (or the second power transistor 302 and the fourth power transistor 306) being on at substantially the same time. The duration of the transition states (or transition overlaps) are chosen to guarantee that one of the power transistors is turned off before the other power transistor is turned on.

Figure 7:
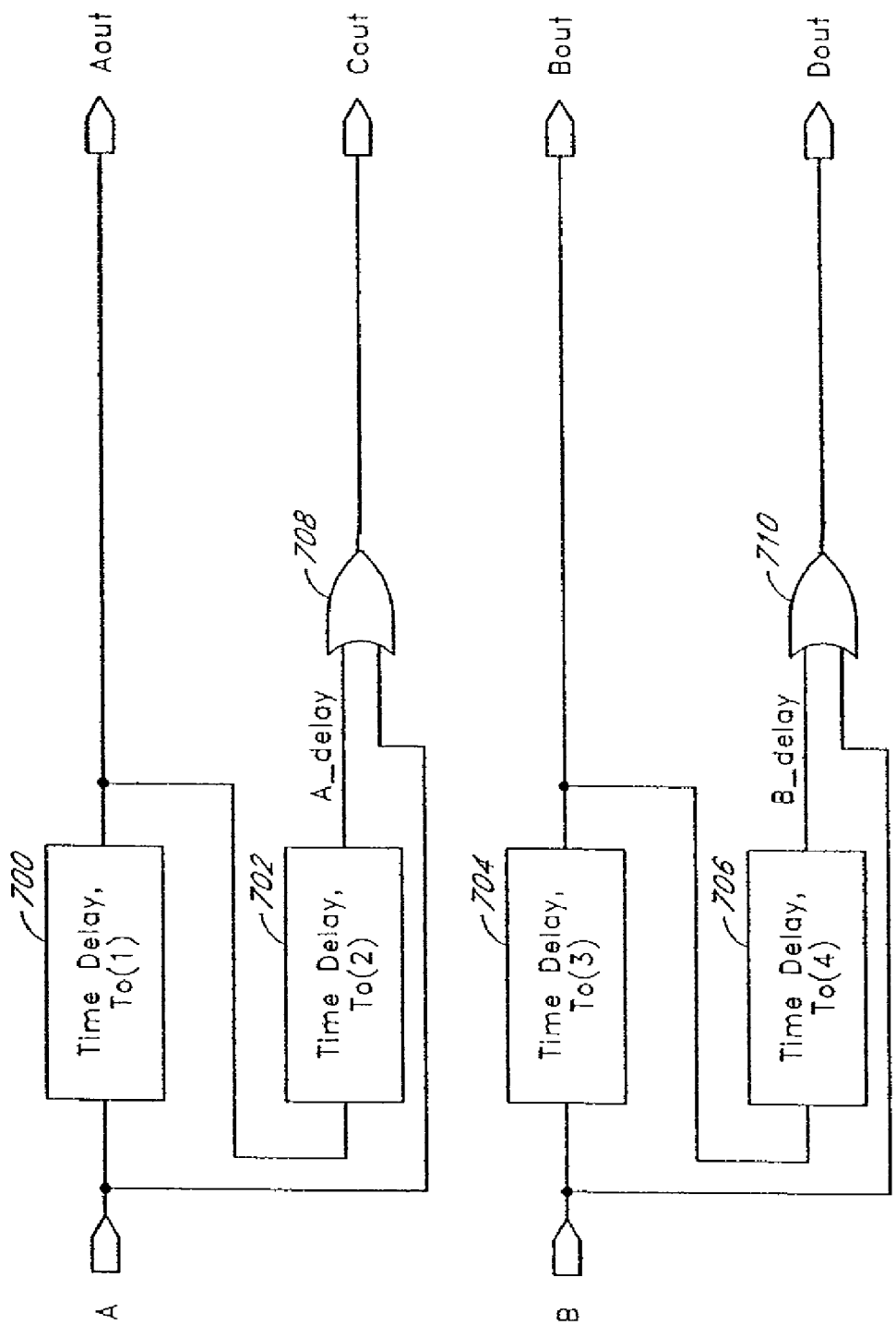
FIG. 7 illustrates one embodiment of a controller circuit for generating the driving waveforms shown in FIG. 6.

FIG. 7 illustrates one embodiment of a controller circuit for generating the driving waveforms shown in FIG. 6. The controller circuit of FIG. 7 accepts two input signals (A, B) with overlapping logic low levels (or inactive states) and generates four driving signals (Aout, Bout, Cout, Dout). For example, the two input signals are substantially similar to the driving signals shown in FIG. 2 for driving a half-bridge switching network. The first and the second driving signals (Aout, Bout) also have overlapping logic low levels (or inactive states).

In one embodiment, a first delay circuit 700 and a second delay circuit 702 are coupled in series to the first input signal (A) to generate the first driving signal (Aout) and the third driving signal (Cout). For example, the first delay circuit 700 receives the first input signal and delays the first input signal by a first time delay (To(1)) to generate the first driving signal. The second delay circuit 702 receives the first driving signal and adds a second time delay (To(2)) to generate a first twice-delayed signal (A_delay). The first twice-delayed signal and the first input signal are provided to a first logic OR circuit (or gate) 708 to generate the third driving signal.

In a similar configuration, a third delay circuit 704 and a fourth delay circuit 706 are coupled in series to the second input signal (B) to generate the second driving signal (Bout) and the fourth driving signal (Dout). For example, the third delay circuit 704 receives the second input signal and delays the second input signal by a third time delay (To(3)) to generate the second driving signal. The fourth delay circuit 706 receives the second driving signal and adds a fourth time delay (To(4)) to generate a second twice-delayed signal (B_delay). The second twice-delayed signal and the second input signal are provided to a second logic OR circuit 710 to generate the fourth driving signal. The time delays for the respective delay circuits 700, 702, 704, 706 can be substantially identical or different.

FIG. 8 is a timing diagram for some signals in the controller circuit of FIG. 7. A graph 800 shows the first input signal (A) with respect to time. A graph 802 shows the first driving signal (Aout) with respect to time. A graph 804 shows the first twice-delayed signal (A_delay) with respect to time. Finally, a graph 806 shows the third driving signal (Cout) with respect to time.

The first input signal has periodic active states or periods of logic high levels (e.g., from times T0-T3 and T6-T9). The first driving signal substantially follows the first input signal with leading and trailing edge transitions delayed by the first time delay (To(1)). The first twice-delayed signal substantially follows the first driving signal with leading and trailing edge transitions further delayed by the second time delay (To(2)). The third driving signal has leading edge transitions follow the leading edge transitions of the first input signal and trailing edge transitions follow the trailing edge transitions of the first twice-delayed signal. Thus, the third driving signal has leading edge transitions that precede the leading edge transitions of the first driving signal by the first time delay and trailing edge transitions that succeed the trailing edge transitions of the first driving signal by the second time delay.

One possible disadvantage of the controller circuit shown in FIG. 7 is limited duty cycle for the driving signals. The pulse width of the input signals cannot be shorter than any of the time delays. In other words, duration of conduction states (e.g., logic high periods for the first driving signal) cannot be shorter than duration of transition states (e.g., delay in edge transitions between the first and the third driving signals or time delays of the delay circuits 700, 702, 704, 706).

Figure 9:
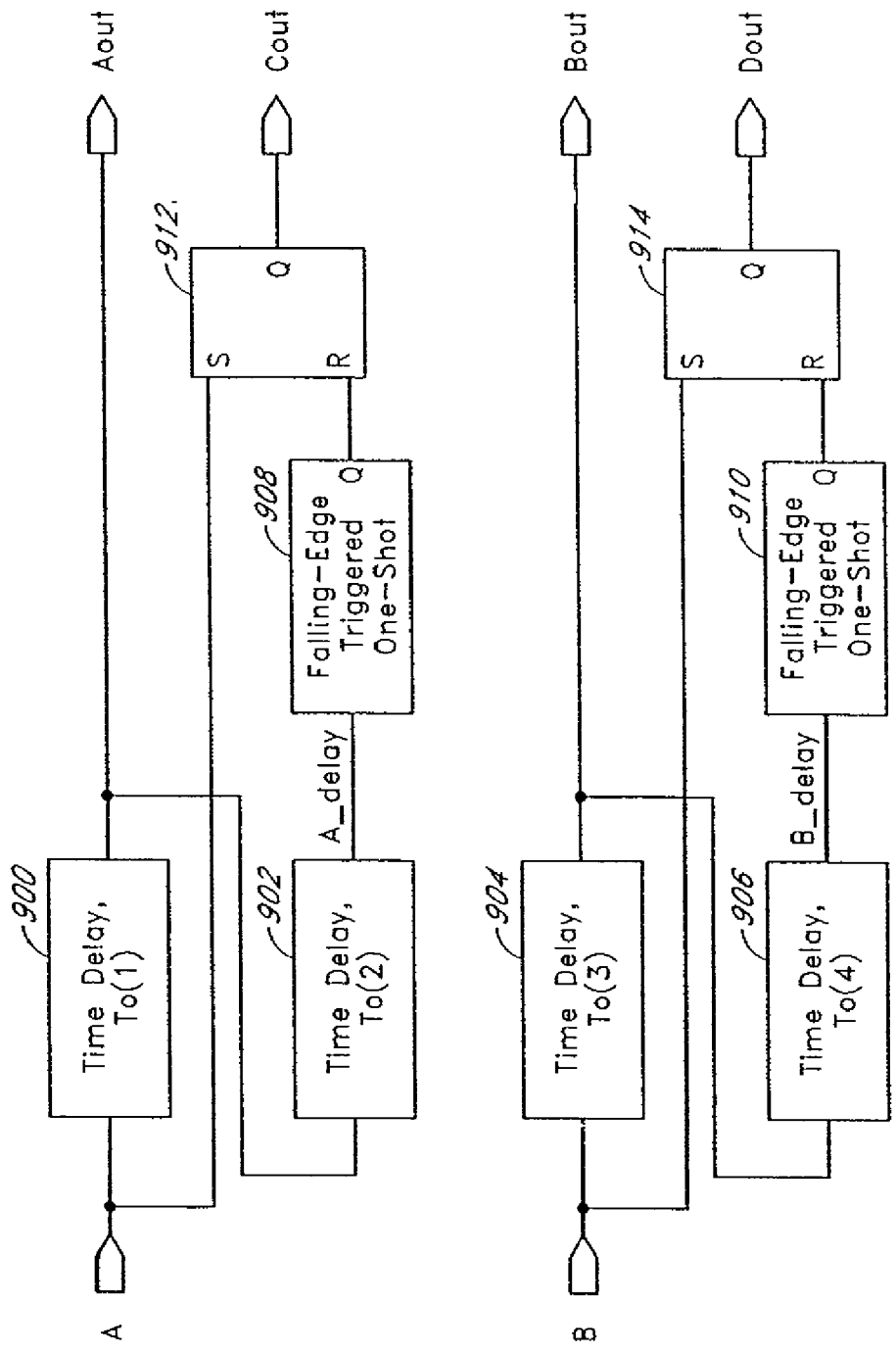
FIG. 9 illustrates another embodiment of a controller circuit for generating the driving waveforms shown in FIG. 6.

FIG. 9 illustrates another embodiment of a controller circuit for generating the driving waveforms shown in FIG. 6. The circuit implementation of FIG. 9 advantageously allows the duration of the conduction states to be shorter than the durations of the transition states. A first delay circuit 900 and a second delay circuit 902 are coupled in series to a first input signal (A) to generate a first driving signal (Aout) and a third driving signal (Cout). For example, the first delay circuit 900 receives the first input signal and adds a first time delay (To(1)) to generate the first driving signal. The second delay circuit 902 receives an output of the first delay circuit 900 and adds a second time delay (To(2)) to generate a first twice-delayed signal (A_delay). The first twice-delayed signal is provided to a first one-shot circuit (e.g., a falling edge-triggered monostable circuit) 908. An output of the first one-short circuit 908 is provided to a reset terminal of a first SR latch 912. The first input signal is provided to a set terminal of the first SR latch 912. The first SR latch 912 outputs the third driving signal (e.g., at its Q output).

In a similar configuration, a third delay circuit 904 and a fourth delay circuit 906 are coupled in series to a second input signal (B) to generate a second driving signal (Bout) and a fourth driving signal (Dout). For example, the third delay circuit 904 receives the second input signal and adds a third time delay (To(3)) to generate the second driving signal. The fourth delay circuit 906 receives an output of the third delay circuit 904 and adds a fourth time delay (To(4)) to generate a second twice-delayed signal (B_delay). The second twice-delayed signal is provided to a second one-shot circuit 910. An output of the second one-shot circuit 910 is provided to a reset terminal of a second SR latch 914. The second input signal is provided to a set terminal of the second SR latch 914. The second SR latch 914 outputs the fourth driving signal.

FIG. 10 is a timing diagram for some signals in the controller circuit of FIG. 9. A graph 1000 shows the first input signal (A) with respect to time. A graph 1002 shows the first driving signal (Aout) with respect to time. A graph 1004 shows the first twice-delayed signal with respect to time. Finally, a graph 1006 shows the third driving signal (Cout) with respect to time.

The first input signal has periodic durations of logic high levels (e.g., from times T0-T1 and T6-T7). The first driving signal substantially follows the first input signal with rising and falling edge transitions delayed by the first time delay (To(1)). The first twice-delayed signal substantially follows the first driving signal with rising and falling edge transitions further delayed by the second time delay (To(2)). In the timing diagrams shown in FIG. 10, the logic high duration of the first input signal is less than the duration of the first time delay or the second time delay. The rising edge of the first input signal sets the rising edge of the third driving signal and the first SR latch 912 holds the logic high level of the third driving signal until the falling edge of the first twice-delayed signal resets the first SR latch 912 using the first one-shot circuit 908. Thus, similar to the circuit implementation of FIG. 7, the third driving signal has rising edge transitions that precede the rising edge transitions of the first driving signal by the first time delay and falling edge transitions that succeed the falling edge transitions of the first driving signal by the second time delay. However, unlike the circuit implementation of FIG. 7, the circuit implementation of FIG. 9 does not have a duty cycle limitation.

FIGS. 11(a)-11(h) illustrate another embodiment of a periodic timing sequence for a full-bridge switching network that further improves power efficiency. FIGS. 11(a)-11(h) are substantially similar to FIGS. 5(a)-5(h) with exception of the idle states shown in FIGS. 5(c) and 5(g). As described above, no net current flows out of the power source during the idle (or power-off) states. However, current is flowing through the primary winding of the transformer 308 and power continues to be delivered to the lamp load 310. The power delivered to the lamp load 310 during the power-off states comes from energy stored in the leakage inductance of the transformer 308. During the power-off states, power efficiency is limited by the on-resistance of conducting transistors. The conducting transistors in FIGS. 5(c) and 5(g) are the third and the fourth power transistors 304, 306, which are PFETs. It is often easier and cheaper to find NFETs with lower on-resistance than PFETs.

Figure 11A:
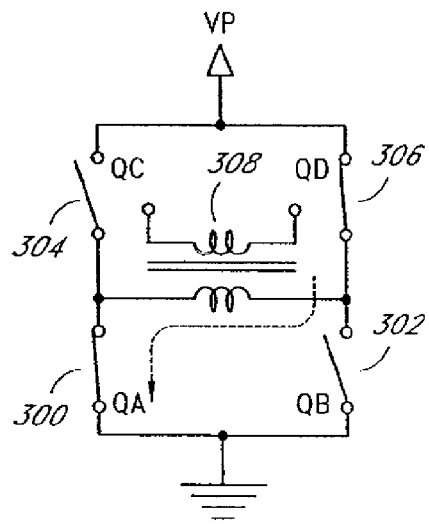
FIGS. 11(a)-11(h) illustrates another embodiment of a periodic timing sequence for a full-bridge switching network that further improves power efficiency.
Figure 11B:
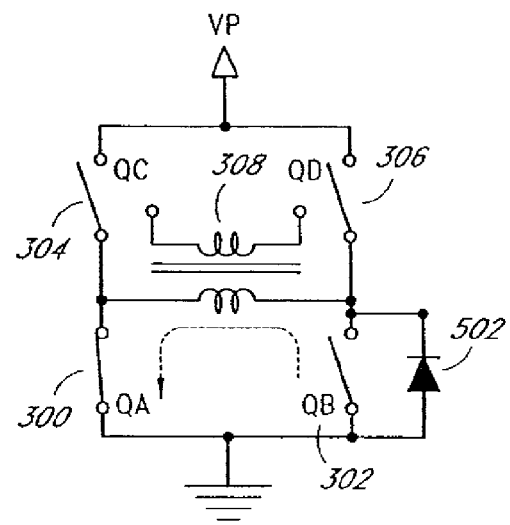
Figure 11C:
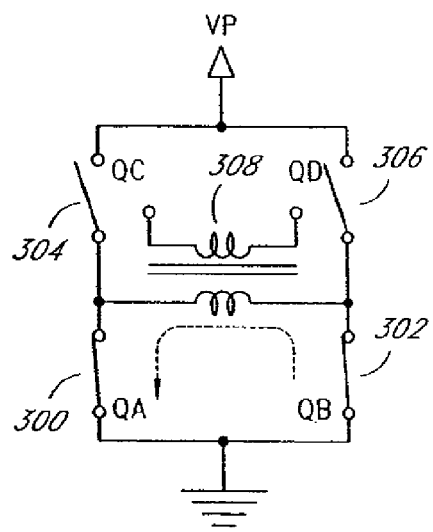
Figure 11D:
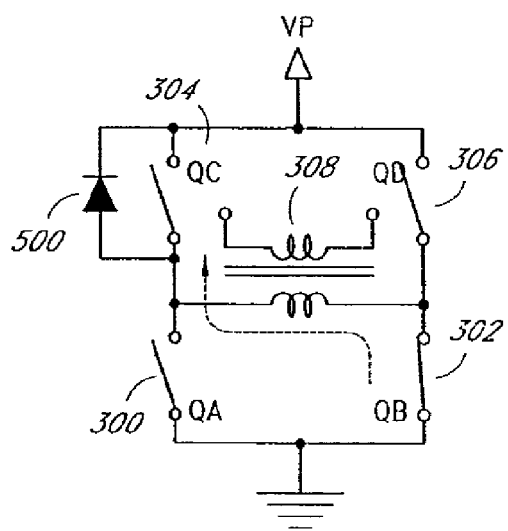

FIGS. 11(a)-11(h) shows the periodic timing sequence in which the first and the second power transistors (e.g., NFETs) 300, 302 are on during the power-off states to further improve power efficiency. For example, FIG. 11(a) illustrates a first conduction state in which the first transistor (QA) 300 and the fourth power transistor (QD) 306 are on while the second transistor (QB) 302 and the third power transistor (QC) 304 are off to allow power to flow from the power source (VP) to the lamp load 310 in a first polarity. For example, current flows from the power source through the fourth power transistor 306, through the primary winding of the transformer 308 and through the first power transistor 300 to ground during the first conduction state. FIGS. 11(b)-11(d) illustrate intermediate steps to transition from the first conduction state to a second conduction state illustrated in FIG. 11(e).

FIG. 11(b) shows a first transition state, following the first conduction state, in which the fourth power transistor 306 turns off. Because of leakage inductance associated with the transformer 308, the current through the primary winding of the transformer 308 does not stop instantaneously. The current flowing through the primary winding of the transformer 308 finds a path to ground through a body diode 502 of the second power transistor 302. The body diode 502 has a cathode coupled to the second terminal of the primary winding and an anode coupled to ground. With the body diode 502 conducting, the source-to-drain voltage of the second power transistor 302 is relatively low (e.g., approximately 0.7 volt or one diode voltage drop).

FIG. 11(c) shows a first idle state, following the first transition state, in which the second power transistor 302 turns on. FIG. 11(d) shows a second transition state, following the first idle state, in which the first power transistor 300 turns off. Similar to the first transition step, the current flowing through the primary winding of the transformer 308 does not stop abruptly. The current flowing through the primary winding of the transformer 308 finds a path through a body diode 500 of the third power transistor 304 back to the power source. The body diode 500 has a cathode coupled to the power source and an anode coupled to the first terminal of the primary winding.

Figure 11E:
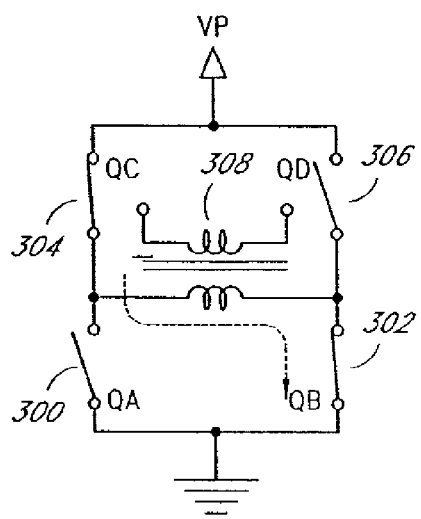

FIG. 11(e) shows the second conduction state, following the second transition state, in which the third power transistor 304 turns on to allow power to flow from the power source to the lamp load 310 in a second polarity. The third power transistor 302 turns on after its body diode 500 starts conducting to take advantage of reduced-voltage switching. In the second conductions state, current flows from the power source through the third power transistor 304, through the primary winding of the transformer 308 and through the second power transistor 302 to ground. The current flows in opposite directions through the primary winding of the transformer 308 between the first and the second conduction states.

Figure 11F:
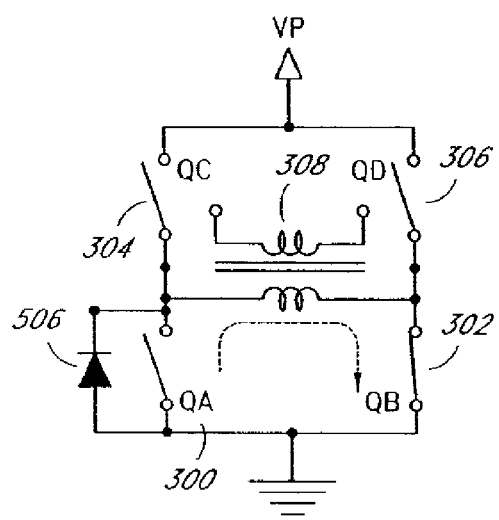
Figure 11G:
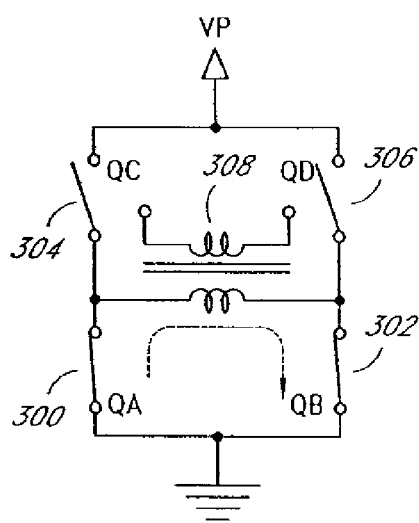
Figure 11H:
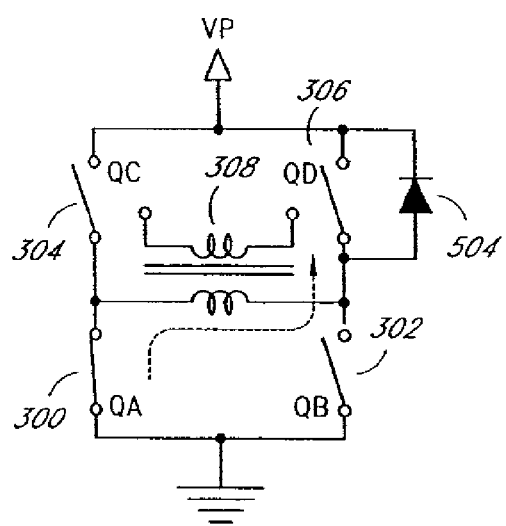

FIGS. 11(f)-11(h) illustrate another set of intermediate steps, following the same principles shown in FIG. 11(b)-1(d), to transition from the second conduction state back to the first conduction state. For example, FIG. 11(f) shows a third transition state, following the second conduction state, in which the third power transistor 304 turns off and the current flowing the primary winding of the transformer 308 finds a path to ground through a body diode 506 of the first power transistor 300. The body diode 506 has a cathode coupled to the first terminal of the primary winding and an anode coupled to ground. FIG. 11(g) shows a second idle state, following the third transition state, in which the first power transistor 300 turns on using zero-voltage switching. Thus, NFETs with relatively lower on-resistance are conducting during the first and the second idle states.

FIG. 11(h) shows a fourth transition state, following the second idle state, in which the second power transistor 302 turns off and the current flowing through the primary winding of the transformer 308 finds a path to the power source through a body diode 504 of the fourth power transistor 306. The body diode 504 has a cathode coupled to the power source and an anode coupled to the second terminal of the primary winding. The fourth power transistor 306 turns on using zero-voltage switching in the next step of the periodic timing sequence to return to the first conduction state.

FIG. 12 illustrates one embodiment of driving waveforms to control transistors in a full-bridge switching network in accordance with the periodic timing sequence depicted in FIGS. 11(a)-11(h). For example, a controller outputs four driving signals to flexibly drive either a half-bridge or a full-bridge switching network using a reduced-voltage (or zero-voltage) switching technique. A graph 1200 shows a first driving signal (Aout) with respect to time. A graph 1202 shows a second driving signal (Bout) with respect to time. A graph 1204 shows a fourth driving signal (Dout) with respect to time. Finally a graph 1206 shows a third driving signal (Cout) with respect to time.

The driving signals shown in FIG. 12 are substantially similar to the driving signals shown in FIG. 6 except the first and the second driving signals have overlapping active states (e.g., from times T3-T4, T7-T8 and T11-T12) while the third and the fourth driving signals have overlapping inactive states to allow the first and the second power transistors (NFETs) 300, 302 to conduct during the idle states. The first and the second driving signals have substantially identical active and inactive durations phase-shifted by approximately 180°. The third and the first driving signals have tracking logic levels (or opposite states) and transition overlaps. That is, the leading edges of the third driving signal precedes the respective leading edges of the first driving signal by a first overlap duration (e.g., from time T6-T7 or T14-T15) and the trailing edges of the third driving signal succeeds the respective trailing edges of the first driving signal by a second overlap duration (e.g., from time T4-T5 or T12-T13). The second and the fourth driving signals also have tracking logic levels and transition overlaps. That is, the leading edges of the fourth driving signal precedes the respective leading edges of the second driving signal by a third overlap duration (e.g., from time T2-T3 or T10-T11) and the trailing edges of the fourth driving signal succeeds the respective trailing edges of the second driving signal by a fourth overlap duration (e.g., from time T0-T1 or T8-T9).

Figure 13:
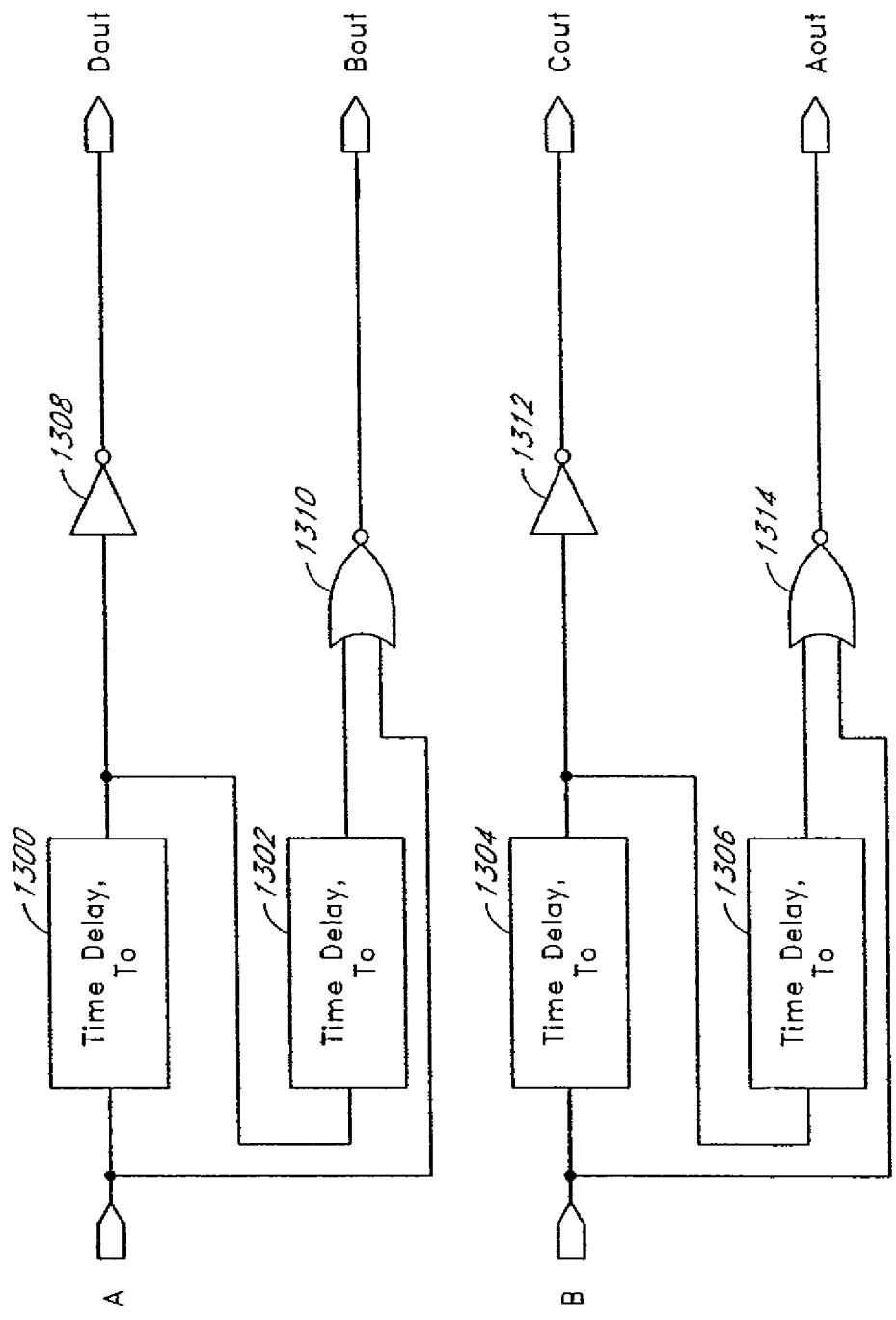
FIG. 13 illustrates one embodiment of a controller circuit for generating the driving waveforms shown in FIG. 12.

FIG. 13 illustrates one embodiment of a controller circuit for generating the driving waveforms shown in FIG. 12. The controller circuit of FIG. 13 accepts two input signals (A, B) with overlapping logic low levels and generates four driving signals (Aout, Bout, Cout, Dout). In one embodiment, the two input signals are substantially similar to driving signals for driving a half-bridge switching network. The first and the second driving signals (Aout, Bout) have overlapping logic high levels (or active states) in the controller circuit of FIG. 13.

In one embodiment, a first delay circuit 1300 and a second delay circuit 1302 are coupled in series to the first input signal (A) to generate the second driving signal (Bout) and the fourth driving signal (Dout). For example, the first delay circuit 1300 receives the first input signal and delays the first input signal by a first time delay. A first inverter 1308 is coupled to an output of the first delay circuit 1300 to generate the fourth driving signal. The second delay circuit 1302 is coupled to the output of first delay circuit 1300 and adds a second time delay to generate a first twice-delayed signal. The first twice-delayed signal and the first input signal are provided to a first logic NOR circuit (or gate) 1310 to generate the second driving signal.

In a similar configuration, a third delay circuit 1304 and a fourth delay circuit 1306 are coupled in series to the second input signal (B) to generate the first driving signal (Aout) and the third driving signal (Cout). For example, the third delay circuit 1304 receives the second input signal and delays the second input signal by a third time delay. A second inverter 1312 is coupled to an output of the third delay circuit 1304 to generate the third driving signal. The fourth delay circuit 1306 is coupled to the output of the third delay circuit 1304 and adds a fourth time delay to generate a second twice-delayed signal. The second twice-delayed signal and the second input signal are provided to a second logic NOR circuit 1314 to generate the first driving signal. The time delays for the respective delay circuits 1300, 1302, 1304, 1306 can be substantially identical (e.g., To) or different.

Figure 14:
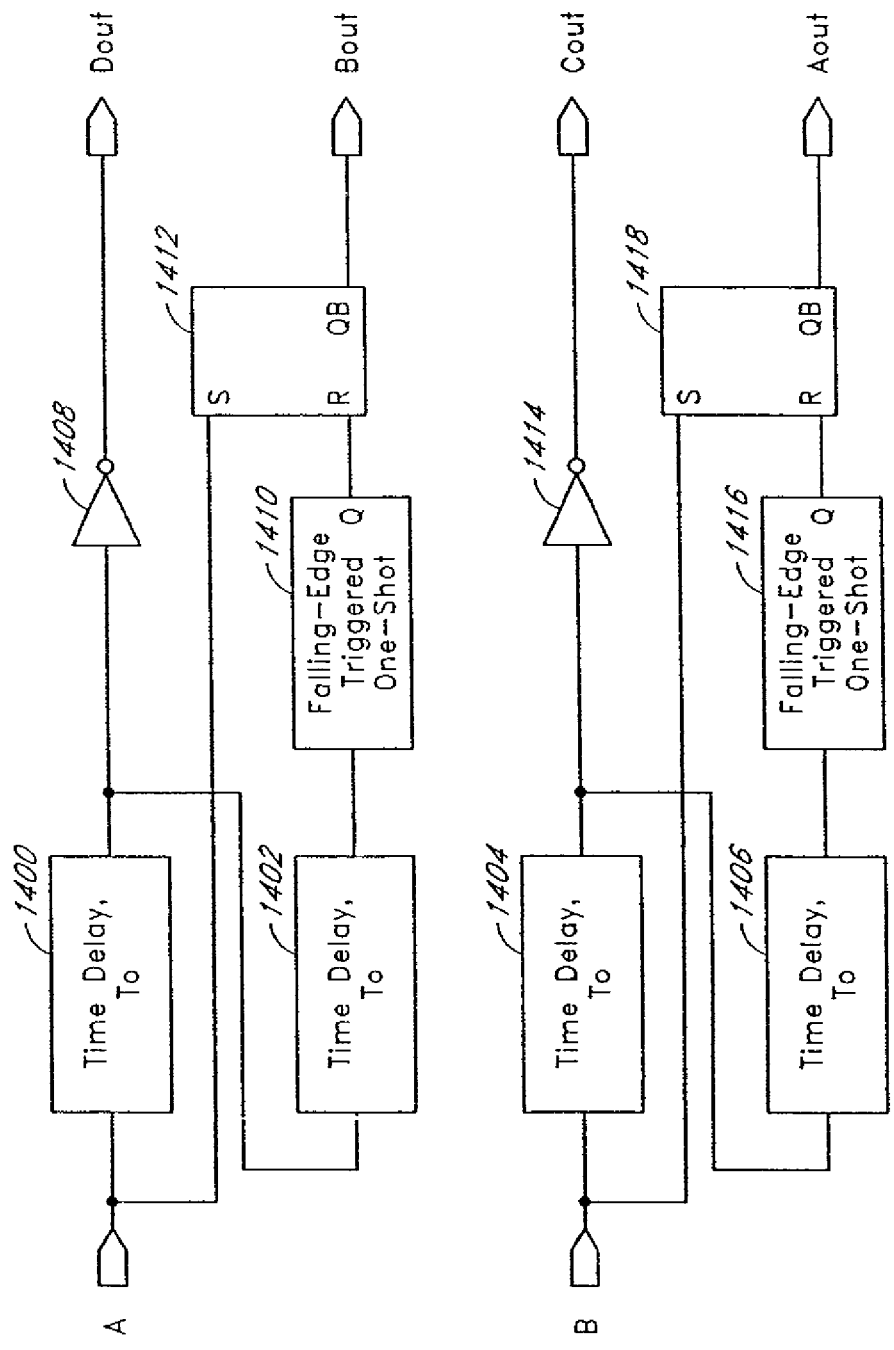
FIG. 14 illustrates another embodiment of a controller circuit for generating the driving waveforms shown in FIG. 12.

FIG. 14 illustrates another embodiment of a controller circuit for generating the driving waveforms shown in FIG. 12. A first delay circuit 1400 and a second delay circuit 1402 are coupled in series to a first input signal (A) to generate a second driving signal (Bout) and a fourth driving signal (Dout). For example, the first delay circuit 1400 receives the first input signal and adds a first time delay. A first inverter is coupled to an output of the first delay circuit 1400 to generate the fourth driving signal. The second delay circuit 1402 receives the output of the first delay circuit 1400 and adds a second time delay to generate a first twice-delayed signal. The first twice-delayed signal is provided to a first one-shot circuit 1410. An output of the first one-short circuit 1410 is provided to a reset terminal of a first latch 1412. The first input signal is provided to a set terminal of the first latch 1412. The first latch 1412 outputs the second driving signal (e.g., at its QB output).

In a similar configuration, a third delay circuit 1404 and a fourth delay circuit 1406 are coupled in series to a second input signal (B) to generate a first driving signal (Aout) and a third driving signal (Cout). For example, the third delay circuit 1404 receives the second input signal and adds a third time delay. A second inverter 1414 is coupled to an output of the third delay circuit 1404 to generate the third driving signal. The fourth delay circuit 1406 receives the output of the third delay circuit 1404 and adds a fourth time delay to generate a second twice-delayed signal. The second twice-delayed signal is provided to a second one-shot circuit 1416. An output of the second one-shot circuit 1416 is provided to a reset terminal of a second latch 1418. The second input signal is provided to a set terminal of the second latch 1418. The second latch 1418 outputs the first driving signal. The circuit implementation of FIG. 14 advantageously has no limitation on the duty cycle of the driving signals.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined by the appended claims.

What is claimed is:

1. A method to flexibly control a half-bridge or a full-bridge switching network in a backlight inverter, the method comprising generating at least four driving signals with alternating states to control the switching network, wherein the first and the second driving signals are substantially identical with an 180° phase shift, the third and the fourth driving signals have rising edges that precede respective rising edges of the first and the second driving signals by a first duration, and the third and the fourth driving signals have falling edges that trail respective falling edges of the first and the second driving signals by a second duration.

2. The method of claim 1, wherein the driving signals are generated using a pair of input signals and four delay circuits.

3. The method of claim 2, wherein the half-bridge network comprises two semiconductor switches and the first and the second driving signals control the two semiconductor switches.

4. The method of claim 3, wherein the full-bridge network comprises four semiconductor switches, the first and the fourth driving signals control the two semiconductor switches that complete a first conduction path to deliver power to a load, and the second and the third driving signals control the two semiconductor switches that complete a second conduction path to deliver power to the load.

5. The method of claim 4, further comprising driving a transformer with the semiconductor switches wherein the semiconductor switches are coupled to a primary winding of the transformer and the load is coupled to a secondary winding of the transformer.

6. The method of claim 5, wherein a secondary winding of the transformer powers a load comprising at least one cold cathode fluorescent lamp that backlights a liquid crystal display.

7. The method of claim 1, wherein four delay circuits generate the first, second, third and fourth driving signals.

8. The method of claim 1, wherein the first driving signal and the second driving signal have variable and substantially identical duty cycles.

9. The method of claim 1, further comprising:
coupling a direct current source to a center tap of a primary winding of a transformer; and
controlling a first N-type field-effect-transistor with first driving signal wherein a first N-type field-effect-transistor is coupled between circuit ground and a first terminal of the primary winding of the transformer; and
controlling a second N-type field-effect-transistor with the second driving signal, wherein the second N-type field-effect-transistor is coupled between circuit ground and a second terminal of the primary winding of the transformer.

10. The method of claim 1, wherein the first driving signal and the third driving signal are generated from a first input signal using two delay circuits, the second driving signal and the fourth driving signal are generated from a second input signal using another two delay circuits.

11. A method to flexibly control a half-bridge or a full-bridge switching network in a backlight inverter, the method comprising:

generating first and the second driving signals are substantially identical with a 180° phase shift;

generating third and the fourth driving signals have rising edges that precede respective rising edges of the first and the second driving signals by a first duration, and wherein the third and the fourth driving signals have falling edges that trail respective falling edges of the first and the second driving signals by a second duration; and driving a switching network comprising a plurality of semiconductor switches with the first, second, third and fourth driving signals to convert a direct current source into an alternating current source to power a load.

12. The method of claim 11, wherein the driving signals are generated using a pair of input signals and four delay circuits.

13. The method of claim 12, wherein the switching network comprises two semiconductor switches and the first and the second driving signals control the two semiconductor switches.

14. The method of claim 13, wherein the switching network comprises four semiconductor switches, the first and the fourth driving signals control the two semiconductor switches that complete a first conduction path to deliver power to the load, and the second and the third driving signals control the two semiconductor switches that complete a second conduction path to deliver power to the load.

15. The method of claim 14, further comprising driving a transformer with the semiconductor switches wherein the semiconductor switches are coupled to a primary winding of the transformer and the load is coupled to a secondary winding of the transformer.

16. The method of claim 15, wherein a secondary winding of the transformer powers a load comprising at least one cold cathode fluorescent lamp that backlights a liquid crystal display.

17. The method of claim 11, wherein four delay circuits generate the first, second, third and fourth driving signals.

18. The method of claim 11, wherein the first driving signal and the second driving signal have variable and substantially identical duty cycles.

19. The method of claim 1, further comprising:
coupling a direct current source to a center tap of a primary winding of a transformer; and
controlling a first N-type field-effect-transistor with first driving signal wherein a first N-type field-effect-transistor is coupled between circuit ground and a first terminal of the primary winding of the transformer; and
controlling a second N-type field-effect-transistor with the second driving signal, wherein the second N-type field-effect-transistor is coupled between circuit ground and a second terminal of the primary winding of the transformer.

20. The method of claim 1, wherein the first driving signal and the third driving signal are generated from a first input signal using two delay circuits, the second driving signal and the fourth driving signal are generated from a second input signal using another two delay circuits.

* * * * *